US012597834B2

(12) United States Patent
Ushida et al.

(10) Patent No.: US 12,597,834 B2
(45) Date of Patent: Apr. 7, 2026

(54) METHOD FOR MANUFACTURING STATOR FOR ROTARY ELECTRIC MACHINE

(71) Applicants: AISIN CORPORATION, Aichi (JP); TOYOTA JIDOSHA KABUSHIKI KAISHA, Toyota (JP); DENSO CORPORATION, Kariya (JP)

(72) Inventors: Hideharu Ushida, Kariya (JP); Hiroyuki Ono, Kariya (JP); Kei Enohata, Kariya (JP); Masaya Nakamura, Kariya (JP); Masanari Nishida, Kariya (JP); Fei Tang, Toyota (JP); Tetsuya Sugimoto, Chiryu (JP)

(73) Assignees: AISIN CORPORATION, Kariya (JP); TOYOTA JIDOSHA KABUSHIKI KAISHA, Toyota (JP); DENSO CORPORATION, Kariya-City (JP)

( * ) Notice: Subject to any disclaimer, the term of this patent is extended or adjusted under 35 U.S.C. 154(b) by 804 days.

(21) Appl. No.: 17/799,845

(22) PCT Filed: Mar. 12, 2021

(86) PCT No.: PCT/JP2021/010218
§ 371 (c)(1),
(2) Date: Aug. 15, 2022

(87) PCT Pub. No.: WO2021/182634
PCT Pub. Date: Sep. 16, 2021

(65) Prior Publication Data
US 2023/0092276 A1      Mar. 23, 2023

(30) Foreign Application Priority Data
Mar. 12, 2020      (JP) .............................. JP2020-042823

(51) Int. Cl.
*H02K 15/35*      (2025.01)
*B23K 26/21*      (2014.01)
(Continued)

(52) U.S. Cl.
CPC ............. *H02K 15/35* (2025.01); *B23K 26/21* (2015.10); *H02K 15/0414* (2013.01);
(Continued)

(58) Field of Classification Search
CPC .... H02K 15/35; H02K 15/0414; H02K 15/30; Y10T 29/49009; B23K 26/21; B23K 26/032; B23K 26/082
See application file for complete search history.

(56) References Cited

U.S. PATENT DOCUMENTS

2011/0240612 A1      10/2011    Maeno
2017/0310198 A1*    10/2017    Fröhlich ................ H02K 15/35
(Continued)

FOREIGN PATENT DOCUMENTS

CN          102307702 A      1/2012
DE      102018112876 A1    12/2019
(Continued)

OTHER PUBLICATIONS

Goldstein et al, "Design of a Compact Stator Winding in an Axial-Flux Permanent Magnet Machine for Aerospace Applications," 2021 IEEE Transportation Electrification Conference & Expo (ITEC), Chicago, IL, USA, 2021, pp. 181-186. (Year: 2021).*
(Continued)

*Primary Examiner* — A. Dexter Tugbang
(74) *Attorney, Agent, or Firm* — OLIFF PLC

(57)      ABSTRACT

A method for manufacturing a stator for a rotary electric machine including: a first disposing process of disposing one workpiece for stator in a first station (ST1); a first welding process of completing welding of a first part of stator coil in
(Continued)

the one workpiece in ST1; a second disposing process of disposing an other one workpiece for stator in a second station (ST2); and a second welding process of completing welding of a second part of stator coil in other one workpiece in ST2, wherein first welding process includes first irradiation process of irradiating first part with a laser beam for welding, second welding process includes second irradiation process of irradiating second part with a laser beam for welding, first and second irradiation processes have a time difference, and laser beam used in each of the first and second irradiation processes are generated based on the same oscillator.

17 Claims, 21 Drawing Sheets

(51) Int. Cl.

| | | |
|---|---|---|
| *H02K 15/0414* | (2025.01) | |
| *H02K 15/30* | (2025.01) | |
| *B23K 26/03* | (2006.01) | |
| *B23K 26/082* | (2014.01) | |

(52) U.S. Cl.
CPC ............ *H02K 15/30* (2025.01); *B23K 26/032* (2013.01); *B23K 26/082* (2015.10); *Y10T 29/49009* (2015.01)

(56) References Cited

U.S. PATENT DOCUMENTS

| | | | |
|---|---|---|---|
| 2018/0036836 A1 | 2/2018 | Nakamura | |
| 2019/0375048 A1* | 12/2019 | Goncalves Do Curral | ................. B23K 26/032 |
| 2020/0007012 A1* | 1/2020 | Ikemoto | ................. H02K 15/02 |

FOREIGN PATENT DOCUMENTS

| | | | | |
|---|---|---|---|---|
| JP | 2018-020340 A | | 2/2018 | |
| JP | 2019-118159 A | | 7/2019 | |
| JP | 2019161822 A | * | 9/2019 | ............. B23K 26/22 |
| JP | 2020-028904 A | | 2/2020 | |

OTHER PUBLICATIONS

Machine Translation of Japanese Patent Publication JP 2019-161822, Apr. 2025. (Year: 2025).*
Machine Translation of Japanese Patent Publication JP 2019-118159, Apr. 2025. (Year: 2025).*
Jul. 19, 2023 Search Report issued in European Patent Application No. 21767572.7.

* cited by examiner

Start

S220

Carry in workpiece to each station

S222

Welding process at each station

S224

Carry out workpiece from each station

End

ST1    ST2    ST3    ST4

| | ST1 | ST2 | ST3 | ST4 | |
|---|---|---|---|---|---|
| State 1 | Workpiece k1 | - | - | - | |
| State 2 | Workpiece k2 | Workpiece k1 | | | |
| State 3 | Workpiece k3 | Workpiece k2 | Workpiece k1 | | |
| State 4 | Workpiece k4 | Workpiece k3 | Workpiece k2 | Workpiece k1 | |
| State 5 | Workpiece k5 | Workpiece k4 | Workpiece k3 | Workpiece k2 | → Workpiece k1 |
| · · · | · · · | · · · | · · · | · · · | |

Time

| Process number | Process content | Irradiation order |
|---|---|---|
| 22 | Workpiece transport (deliver) | |
| 23 | Chuck + "position correction" in irradiation area A | |
| 24 | "Welding" in scan area A | 1 |
| 25 | "head rotation + "position correction" in irradiation area B | |
| 26 | "Welding" in scan area B | 3 |
| 27 | Head rotation + "position correction" in irradiation area C | |
| 28 | "Welding" in scan area C | 5 |
| 29 | Unchuck + workpiece rotation + chuck | |
| 30 | "Position correction" in scan area A | |
| 31 | Chuck + position correction in irradiation area A | 7 |
| 33 | Workpiece transport (deliver) | |
| 34 | Chuck + position correction in irradiation area A | |
| 35 | Welding in scan area A | 2 |
| 36 | Head rotation + position correction in irradiation area B | |
| 37 | Welding in scan area B | 4 |
| 38 | Head rotation + position correction in irradiation area C | |
| 39 | Welding in scan area C | 6 |
| 40 | Unchuck + workpiece rotation + chuck | |
| 41 | Position correction in scan area B | |
| 42 | Welding in scan area B | 8 |

Time →

ST1, ST2

Timeline labels: E22, E23, E24, E25, E26, E27, E28, E29, E30, E31, R180, R181, E33, E34, E35, E36, E37, E38, E39, E40, E41, E42, R180, R181

1900, 1902, 1903, 1904

METHOD FOR MANUFACTURING STATOR FOR ROTARY ELECTRIC MACHINE

TECHNICAL FIELD

The present disclosure relates to a method for manufacturing a stator for a rotary electric machine.

BACKGROUND ART

A method for manufacturing a stator is known in which a tip end part of one coil piece for forming a coil for a stator for a rotary electric machine and a tip end part of an other one coil piece are abutted on each other, and a welding target location related to the abutted tip end part is irradiated with a laser beam in such a mode that an irradiation position moves in a loop shape.

CITATIONS LIST

Patent Literature

Patent Literature 1: JP 2018-20340 A

SUMMARY OF DISCLOSURE

Technical Problems

However, in the conventional technique as described above, it is difficult to achieve an efficient method for manufacturing the stator. In particular, in a case of a stator for a rotary electric machine in which the stator coil is formed of a plurality of coil pieces in the form of segment coil, the number of welded locations becomes relatively large, and an efficient method for manufacturing is required.

Therefore, the present disclosure provides an efficient method for manufacturing a stator for a rotary electric machine.

Solutions to Problems

According to one aspect of the present disclosure, there is provided a method for manufacturing a stator for a rotary electric machine in which a stator coil is formed of a plurality of coil pieces in a form of segment coil, the method including:

a first disposing process of disposing one workpiece for stator in a first station;

a first welding process of completing welding of a first part of a stator coil in the one workpiece in the first station;

a second disposing process of disposing an other one workpiece for stator in a second station; and a second welding process of completing welding of a second part of a stator coil in the other one workpiece in the second station, in which the first welding process includes a first irradiation process of irradiating a coil piece of a welding target related to the first part with a laser beam for welding, the second welding process includes a second irradiation process of irradiating a coil piece of a welding target related to the second part with a laser beam for welding, and the first irradiation process and the second irradiation process have a time difference, and the laser beam used in each of the first irradiation process and the second irradiation process is generated based on a same oscillator.

ADVANTAGEOUS EFFECTS OF DISCLOSURE

According to the present disclosure, it is possible to provide an efficient method for manufacturing a stator for a rotary electric machine.

BRIEF DESCRIPTION OF DRAWINGS

FIG. 16B is a schematic diagram showing another example of a head switching type laser irradiation device.

FIG. 19 is an explanatory diagram of an example of a cooperation mode that can be achieved using a 6-turn holding type jig.

DESCRIPTION OF EMBODIMENTS

Each example will be described in detail below with reference to the accompanying drawings. In the present description, "predetermined" is used to mean "defined in advance".

Figure 1:
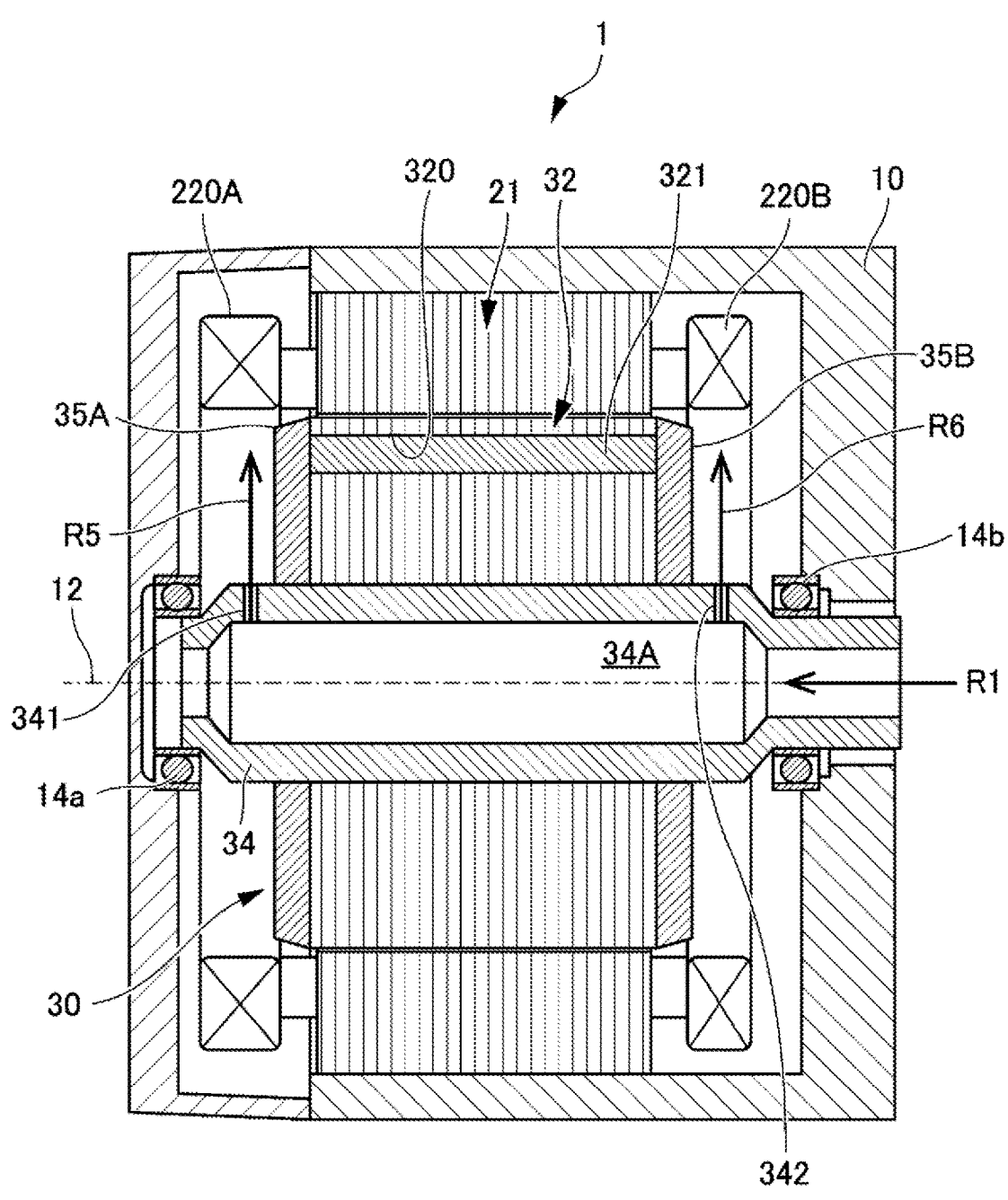
FIG. 1 is a cross-sectional view schematically showing a cross-sectional structure of a motor according to an example.

FIG. 1 is a cross-sectional view schematically showing a cross-sectional structure of a motor 1 (an example of a rotary electric machine) according to an example.

FIG. 1 illustrates a rotation axis 12 of the motor 1. In the following description, the axial direction refers to a direction in which the rotation axis (rotation center) 12 of the motor 1 extends, and the radial direction refers to a radial direction about the rotation axis 12. Therefore, the radially outside refers to a side away from the rotation axis 12, and the radially inside refers to a side toward the rotation axis 12. The circumferential direction corresponds to a rotation direction around the rotation axis 12.

The motor 1 may be, for example, a vehicle driving motor used in a hybrid vehicle or an electric vehicle. However, the motor 1 may be used for any other application.

The motor 1 is an inner rotor type, and is provided such that a stator 21 surrounds the radially outside of a rotor 30. A radially outside of the stator 21 is fixed to a motor housing 10.

The rotor 30 is disposed radially inside the stator 21. The rotor 30 includes a rotor core 32 and a rotor shaft 34. The rotor core 32 is fixed to radially outside the rotor shaft 34 and rotates integrally with the rotor shaft 34. The rotor shaft 34 is rotatably supported by the motor housing 10 via bearings 14a and 14b. The rotor shaft 34 defines the rotation axis 12 of the motor 1.

The rotor core 32 is formed of, for example, an annular ferromagnetic lamination steel plate. A permanent magnet 321 is inserted into the rotor core 32. The number, arrangement, and the like of the permanent magnets 321 are arbitrary. In a modification, the rotor core 32 may be formed of a green compact in which a magnetic powder is compressed and solidified.

End plates 35A and 35B are attached to both axial sides of the rotor core 32. The end plates 35A and 35B may have an adjustment function of an imbalance of the rotor 30 (a function of eliminating the imbalance by cutting or the like) in addition to a support function of supporting the rotor core 32.

As shown in FIG. 1, the rotor shaft 34 has a hollow part 34A. The hollow part 34A extends over the entire length in the axial direction of the rotor shaft 34. The hollow part 34A may function as an oil passage. For example, as indicated by arrow R1 in FIG. 1, oil is supplied to the hollow part 34A from one end side in the axial direction, and the oil flows along the radially inside surface of the rotor shaft 34, whereby the rotor core 32 can be cooled from the radially inside. The oil flowing along the radially inside surface of the rotor shaft 34 may be ejected (arrows R5 and R6) radially outward through oil holes 341 and 342 formed at both end parts of the rotor shaft 34, for use in cooling coil ends 220A and 220B.

Although FIG. 1 shows the motor 1 having a specific structure, the structure of the motor 1 is arbitrary as long as the motor 1 includes a stator coil 24 (described later) joined by welding. Therefore, for example, the rotor shaft 34 needs not have the hollow part 34A, or may have a hollow part having a significantly smaller in inner diameter than the hollow part 34A. Although a specific method of cooling is disclosed in FIG. 1, the method of cooling the motor 1 is arbitrary. Therefore, for example, an oil introduction pipe inserted to be into the hollow part 34A may be provided, or oil may be dropped from the oil passage in the motor housing 10 toward the coil ends 220A and 220B from the radial outside.

Although the rotor 30 is the inner rotor type motor 1 arranged inside the stator 21 in FIG. 1, the present disclosure may be applied to a motor of another form. For example, the present disclosure may be applied to an outer rotor type motor in which the rotor 30 is concentrically arranged on the outside of the stator 21, a dual rotor type motor in which the rotor 30 is arranged on both the outside and the inside of the stator 21, and the like.

Next, the configuration related to the stator 21 will be described in detail with reference to FIG. 2 and subsequent drawings.

Figure 2:
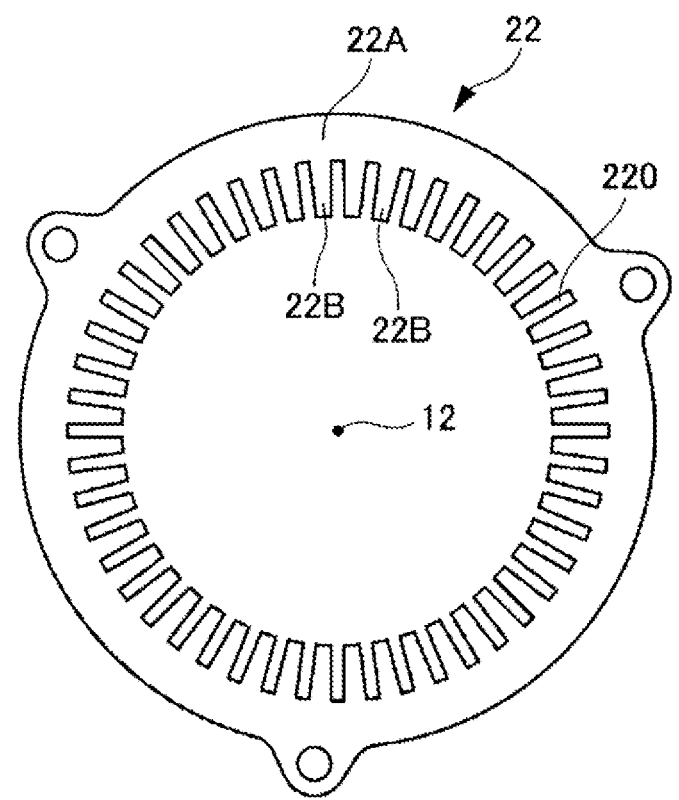
FIG. 2 is a plan view of a stator core in a single state.
Figure 3:
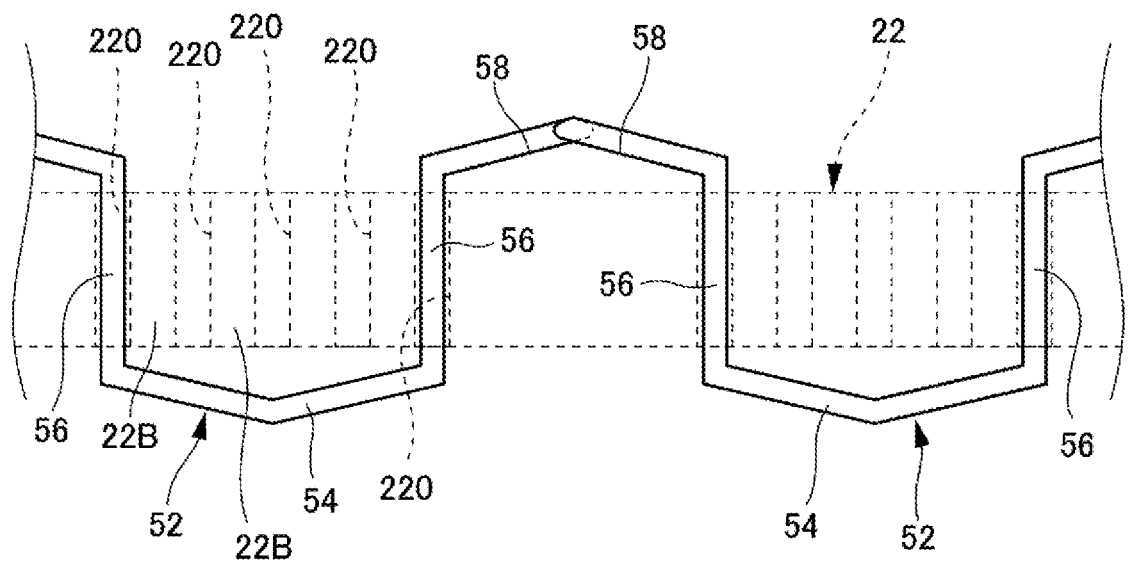
FIG. 3 is a view schematically showing a pair of coil pieces assembled to the stator core.
Figure 4:
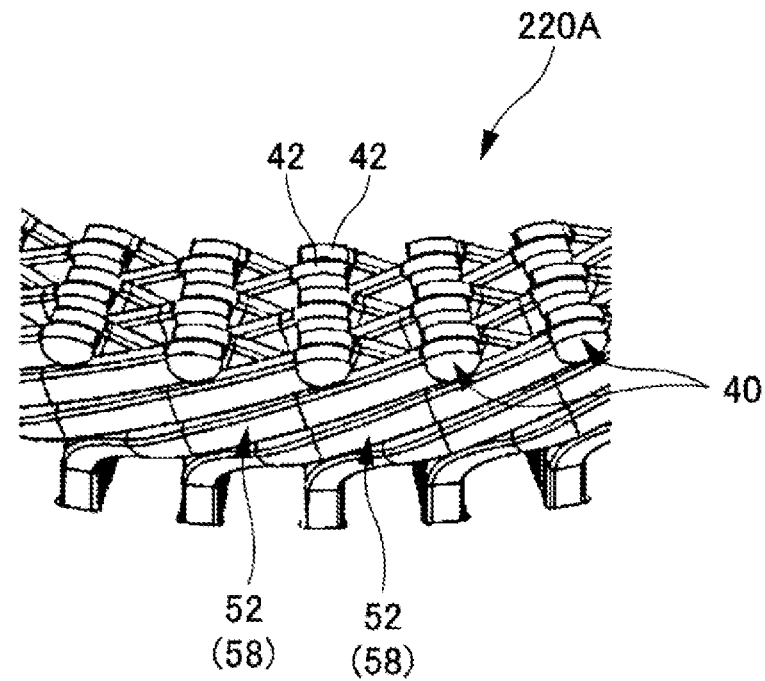
FIG. 4 is a perspective view of a periphery of a coil end of a stator.
Figure 5:
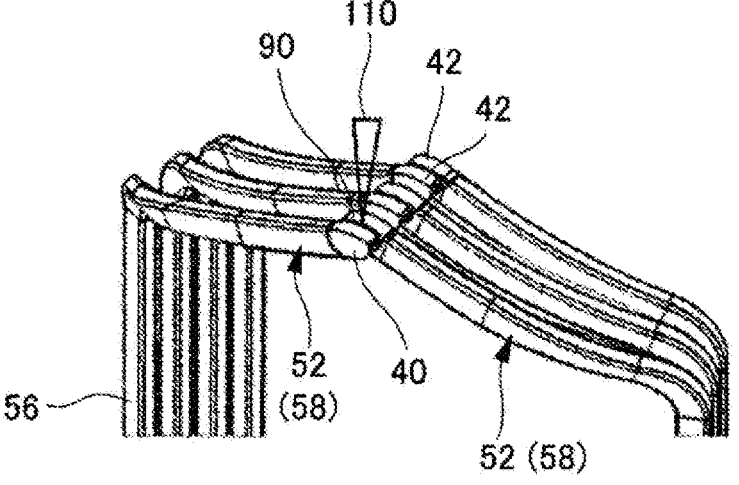
FIG. 5 is a perspective view showing an excerption of a part of an in-phase coil piece.

FIG. 2 is a plan view of a stator core 22 in a single state. FIG. 3 is a view schematically showing a pair of coil pieces 52 assembled to the stator core 22. FIG. 3 shows a relationship between the pair of coil pieces 52 and a slot 220 in a state where the radially inside of the stator core 22 is developed. In FIG. 3, the stator core 22 is indicated by a dotted line, and a part of the slot 220 is not illustrated. FIG. 4 is a perspective view of the periphery of the coil end 220A of the stator 21. FIG. 5 is a perspective view showing an excerption of a part of the in-phase coil piece 52.

The stator 21 includes the stator core 22 and the stator coil 24.

The stator core 22 is formed of, for example, an annular ferromagnetic lamination steel plate, but in the modification, the stator core 22 may be formed of a green compact in which a magnetic powder is compressed and solidified. Note that the stator core 22 may be formed by split cores split in the circumferential direction, or may be in a form not split in the circumferential direction. A plurality of the slots 220 around which the stator coil 24 is wound is formed on the radially inside of the stator core 22. Specifically, as shown in FIG. 2, the stator core 22 includes an annular back yoke 22A and a plurality of teeth 22B extending radially inward from the back yoke 22A, and the slot 220 is formed between the plurality of teeth 22B in the circumferential direction. The number of slots 220 is arbitrary, but is 48 as an example in the present example.

The stator coil 24 includes a U-phase coil, a V-phase coil, and a W-phase coil (hereinafter, referred to as "phase coil" when U, V, and W are not distinguished). A base end of each phase coil is connected to an input terminal (not illustrated), and a terminal end of each phase coil is connected to the terminal end of another phase coil to form a neutral point of the motor 1. That is, the stator coil 24 is star-connected. However, the connection mode of the stator coil 24 may be appropriately changed according to required motor characteristics and the like, and for example, the stator coil 24 may be delta-connected instead of star-connection. The stator coil 24 includes a part related to the neutral point and a part related to a power line, but hereinafter, parts other than these are sometimes referred to as "general part".

Figure 6:
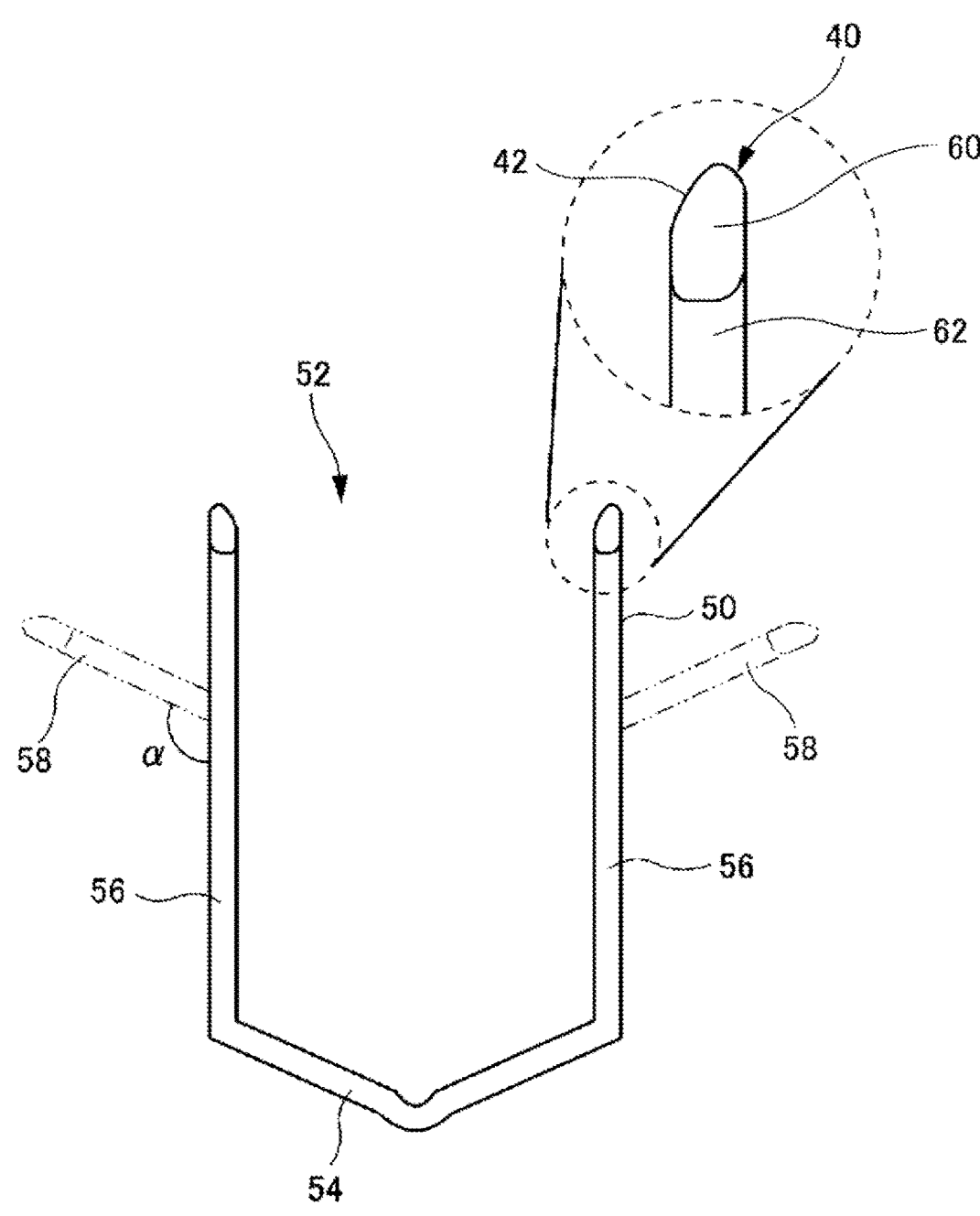
FIG. 6 is a schematic front view of one coil piece.

Each phase coil is configured by joining a plurality of the coil pieces 52. FIG. 6 is a schematic front view of one coil piece 52. The coil piece 52 is in the form of a segment coil in which the phase coil is divided into units that are easy to assemble (e.g., units to be inserted into two slots 220). The coil piece 52 is formed by coating a linear conductor (rectangular wire) 60 having a substantially rectangular cross section with an insulating film 62. In the present example, the linear conductor 60 is formed of copper, for example. However, in the modification, the linear conductor 60 may be formed of another conductor material such as iron.

In a stage before being assembled to the stator core 22, the coil piece 52 may be shaped into substantially U shape having a pair of straight parts 50 and a coupling part 54 that couples the pair of straight parts 50. When the coil piece 52 is assembled to the stator core 22, the pair of straight parts 50 are each inserted into the slot 220 (see FIG. 3). Due to this, as shown in FIG. 3, the coupling part 54 extends in the circumferential direction so as to straddle the plurality of teeth 22B (and the plurality of slots 220 accordingly) on the other axial end side of the stator core 22. The number of the slots 220 straddled by the coupling part 54 is arbitrary, but is 3 in FIG. 3. After being inserted into the slot 220, the straight part 50 is bent in the circumferential direction in the middle as indicated by a two-dot chain line in FIG. 6. Due to this, the straight part 50 becomes a leg part 56 extending in the axial direction in the slot 220 and a transfer part 58 extending in the circumferential direction on one axial end side of the stator core 22.

In FIG. 6, the pair of straight parts 50 are bent in directions away from each other, but the present disclosure is not limited thereto. For example, the pair of straight parts 50 may be bent in directions approaching each other. The stator coil 24 sometimes has also a neutral point coil piece or the like for coupling terminal ends of three-phase coils to form a neutral point. The shape of a tip end part 40 described later may be applied to these coupling coil piece and neutral point coil piece.

A plurality of the leg parts 56 of the coil piece 52 shown in FIG. 6 are inserted into one slot 220 side by side in the radial direction. Therefore, a plurality of the transfer parts 58 extending in the circumferential direction are arranged side by side in the radial direction on one axial end side of the stator core 22. As shown in FIGS. 3 and 5, the transfer part 58 of one coil piece 52 that protrudes from one slot 220 and extends on a circumferential first side (e.g., clockwise orientation) is joined to the transfer part 58 of an other one coil piece 52 that protrudes from another slot 220 and extends on a circumferential second side (e.g., anticlockwise direction).

In the present example, as an example, six coil pieces 52 are assembled to one slot 220. Hereinafter, a first turn, a second turn, and a third turn are also referred to in order from the outermost coil piece 52 in the radial direction. In this case, the tip end parts 40 of the coil piece 52 of the first turn and the coil piece 52 of the second turn are joined to each other by the joining process described later, the tip end parts 40 of the coil piece 52 of the third turn and the coil piece 52 of a fourth turn are joined to each other by the joining process described later, and the tip end parts 40 of the coil piece 52 of a fifth turn and the coil piece 52 of a sixth turn are joined to each other by the joining process described later.

Here, the coil piece 52 is covered with the insulating film 62 as described above, but the insulating film 62 is removed only at the tip end part 40. This is to ensure electrical connection with the other coil piece 52 at the tip end part 40. As shown in FIGS. 5 and 6, of the tip end part 40 of the coil piece 52, an axially outside end surface 42, i.e., one end surface in a width direction of the coil piece 52 is finally an arc surface protruding outward in the axial direction.

Figure 7:
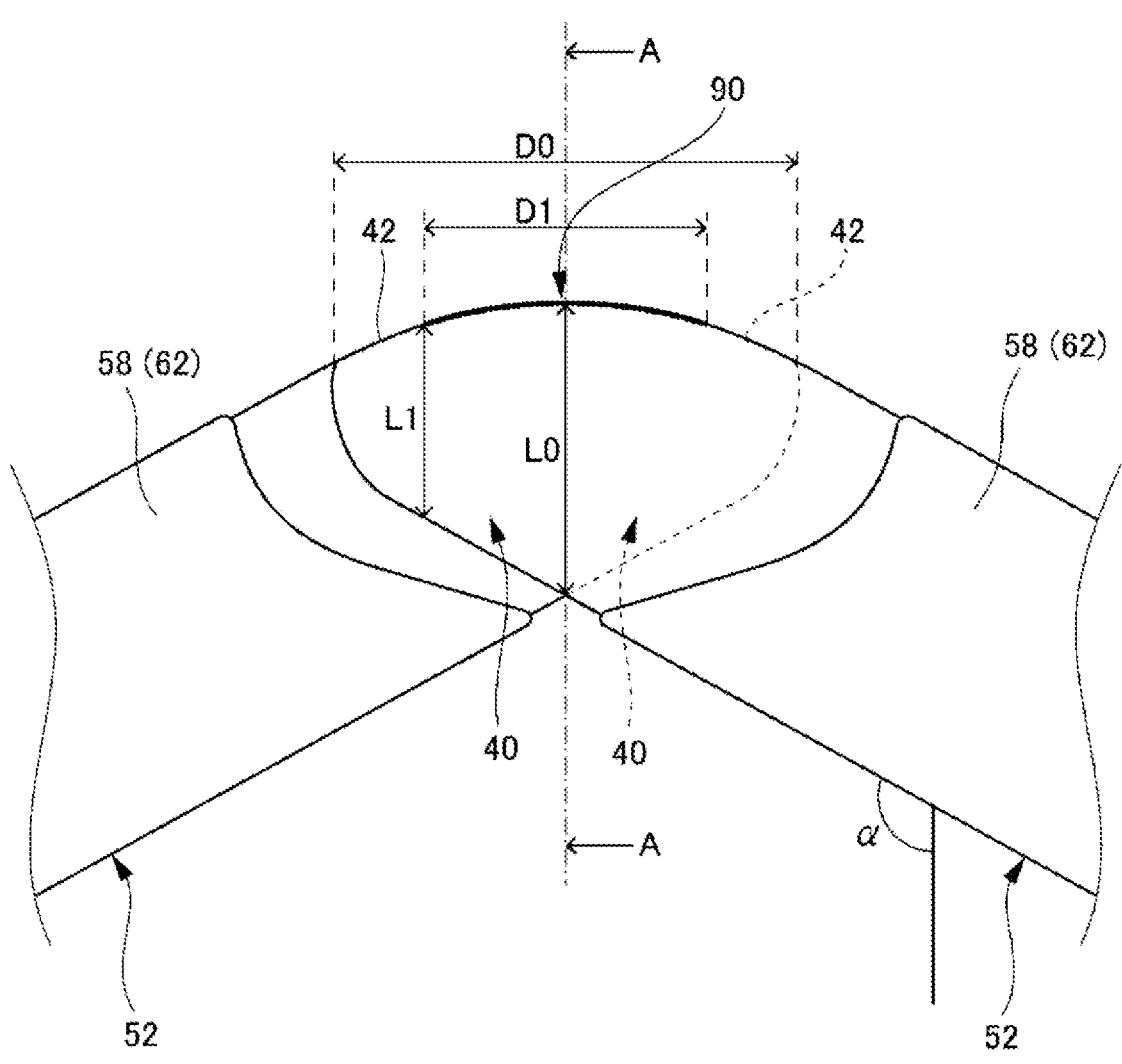
FIG. 7 is a view showing tip end parts of coil pieces joined to each other and a vicinity thereof.
Figure 8:
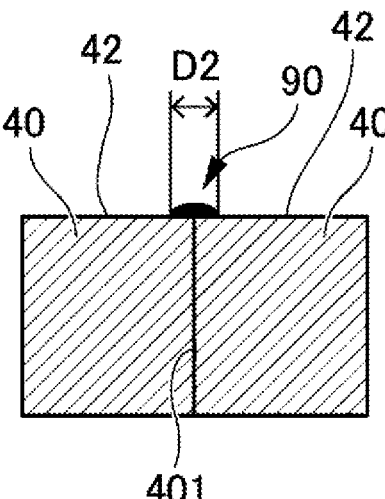
FIG. 8 is a cross-sectional view taken along line A-A of FIG. 7 passing through the welding target location.

FIG. 7 is a view showing the tip end parts 40 of the coil pieces 52 joined to each other and the vicinity thereof. FIG. 7 schematically shows a circumferential range D1 of a welding target location 90. FIG. 8 is a cross-sectional view taken along line A-A of FIG. 7 passing through the welding target location 90.

When the tip end part 40 of the coil piece 52 is joined, the two tip end parts 40 to be joined to each other may be joined to overlap each other in a thickness direction such that central axes O of the arc surfaces (axially outside end surfaces 42) coincide with each other. By thus aligning the central axes to overlap, even when a bending angle α is relatively large or small, the lines on the axial outsides of the two tip end parts 40 to be joined to each other coincide with each other and can be appropriately overlapped.

Here, in the present example, welding is used as a joining method for joining the tip end parts 40 of the coil pieces 52. In the present example, as a method for welding, not arc welding typified by TIG welding but laser welding using a laser beam source as a heat source is adopted. By using laser welding instead of TIG welding, it is possible to reduce the axial lengths of the coil ends 220A and 220B. That is, in the case of TIG welding, it is necessary to bend the tip end parts of the coil pieces to be abutted on each other to the axial outside and extend the tip end parts in the axial direction, whereas in the case of laser welding, there is no need to bend the tip end parts in the axial direction, and as shown in FIG. 7, welding can be achieved in a state where the tip end parts 40 of the coil pieces 52 to be abutted on each other extend in the circumferential direction. This allows the axial lengths of the coil ends 220A and 220B to be reduced as compared with the case where the tip end parts 40 of the coil pieces 52 to be abutted on each other are bent axially outward and extend in the axial direction.

In the laser welding, as schematically shown in FIG. 5, a laser beam 110 for welding is applied to the welding target location 90 in the abutted two tip end parts 40. Note that the irradiation direction (propagation direction) of the laser beam 110 is substantially parallel to the axial direction, and is a direction directed from the axially outside to the axially outside end surfaces 42 of the abutted two tip end parts 40. In the case of the laser welding, since heating can be performed locally, only the tip end part 40 and the vicinity thereof can be heated, and damage (carbonization) and the like of the insulating film 62 can be effectively reduced. As a result, it is possible to electrically connect the plurality of coil pieces 52 while maintaining appropriate insulation performance.

As shown in FIG. 7, the circumferential range D1 of the welding target location 90 is a part excluding both ends in an entire circumferential range D0 of the axially outside end surface 42 at the abutment part between the tip end parts 40 of the two coil pieces 52. This is because it is difficult to secure a sufficient welding depth (see dimension L1 in FIG. 7) at both ends due to the convex arc surface of the axially outside end surface 42. The circumferential range D1 of the welding target location 90 may be adapted so as to ensure a necessary joining area between the coil pieces 52, a necessary welding strength, and the like.

As shown in FIG. 8, a radial range D2 of the welding target location 90 is centered on an abutment surface 401 between the tip end parts 40 of the two coil pieces 52. The radial range D2 of the welding target location 90 may correspond to the diameter (beam diameter) of the laser beam 110. That is, the laser beam 110 is irradiated in such a mode that the irradiation position linearly changes along the circumferential direction without substantially changing in the radial direction.

Figure 9:
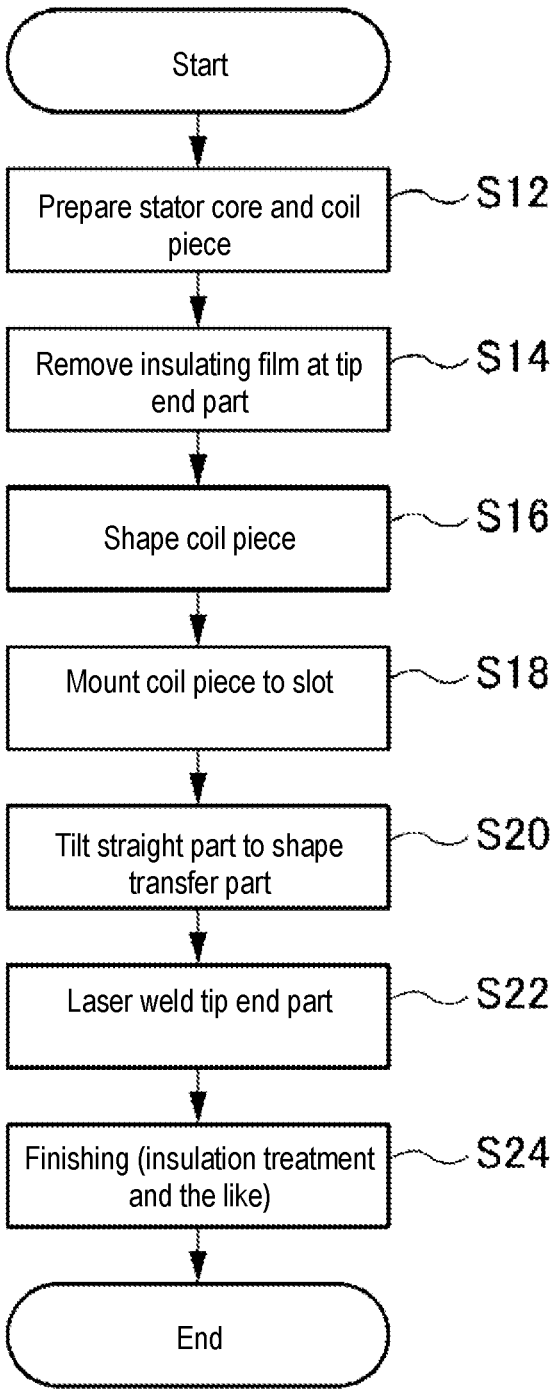
FIG. 9 is a flowchart schematically showing a flow of manufacturing a stator.

Next, the flow of manufacturing the stator 21 will be outlined with reference to FIG. 9. FIG. 9 is a flowchart schematically showing the flow of manufacturing the stator 21.

The method for manufacturing the stator 21 first includes a process (S12) of preparing the stator core 22 and preparing the straight coil piece 52 (the coil piece 52 before shaping) for forming the stator coil 24.

Subsequently, the method for manufacturing the stator 21 includes a removal process (S14) of removing the insulating film 62 at the tip end part 40 (starting end and terminal end) of the coil piece 52. The method for removing this insulating film 62 is arbitrary, but for example, the insulating film 62 may be mechanically removed using a blade, or may be chemically removed by etching or the like. The insulating film 62 may be thermally removed using a laser.

In order to join the coil pieces 52 to each other, at least the insulating film 62 of the surface to be actually joined in the tip end part 40 only needs to be removed, and the insulating film 62 of the other surfaces (the other surface of the back surface or the front surface, and the side surface) may remain.

Subsequently, the method for manufacturing the stator 21 includes, after the removal process, a shaping process (S16) of bending the straight coil piece 52 using a mold or the like and shaping the coil piece. For example, the coil piece 52 is shaped into a substantially U shape having the pair of straight parts 50 and the coupling part 54 that couples the pair of straight parts 50 as shown in FIG. 6. Note that the order of step S16 and step S14 may be reversed.

Subsequently, the method for manufacturing the stator 21 includes, after the shaping process, a mounting process (S18) of inserting the coil piece 52 into the slot 220 of the stator core 22. An insertion process is completed at the stage when the insertion of all the coil pieces 52 is completed.

Subsequently, the method for manufacturing the stator 21 includes, after the insertion process, a deformation process (S20) of tilting in the circumferential direction a part of the straight part 50 that protrudes from each slot 220 using a dedicated jig. Due to this, the straight part 50 becomes a leg part 56 extending in the axial direction in the slot 220 and a transfer part 58 extending in the circumferential direction on one axial end side.

Subsequently, the method for manufacturing the stator 21 includes, after the deformation process, a joining process (S22) of joining the tip end part 40 of the transfer part 58 of one coil piece 52 extending to the circumferential first side (e.g., clockwise orientation) and the tip end part 40 of the transfer part 58 of an other one coil piece 52 extending to the circumferential second side (e.g., anticlockwise direction). In the present example, as described above, the two tip end parts 40 are joined by welding. Detail of the joining process (joining process by laser welding) is as described above. Welding is performed every two tip end parts 40, and when all sets of two tip end parts 40 have been welded, the joining process ends.

Subsequently, the method for manufacturing the stator 21 includes a finishing process (S24) after the joining process. The finishing process may include a process of performing insulation treatment on the coil ends 220A and 220B formed by assembling the coil pieces 52 as described above, for example. The insulation treatment may be a treatment of molding resin in a mode of sealing the entire coil ends 220A and 220B, or a treatment of applying varnish or the like.

Next, the above-described joining process (step S22 in FIG. 9) will be described in detail with reference to FIG. 10 and subsequent drawings.

Figure 10:
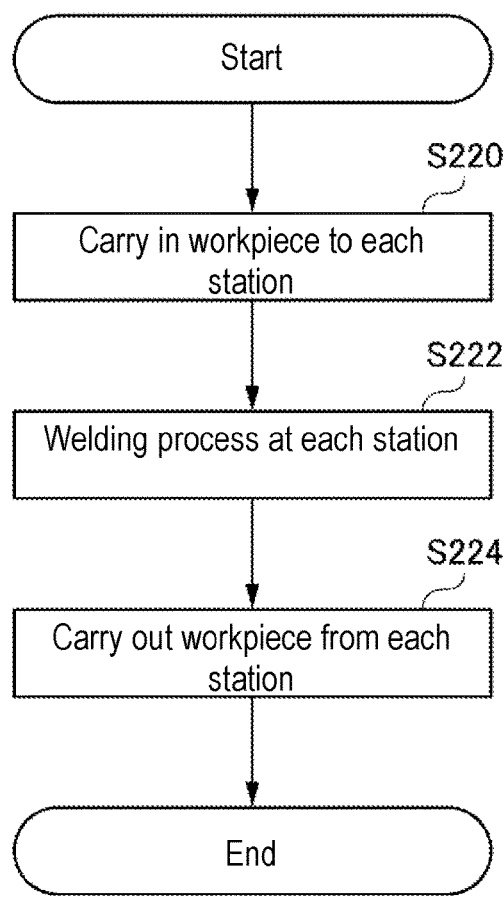
FIG. 10 is a flowchart showing a flow of each process in a joining process (step S22 in FIG. 9).
Figure 11:
FIG. 11 is an explanatory diagram of a plurality of stations.
Figures 12, 13A:
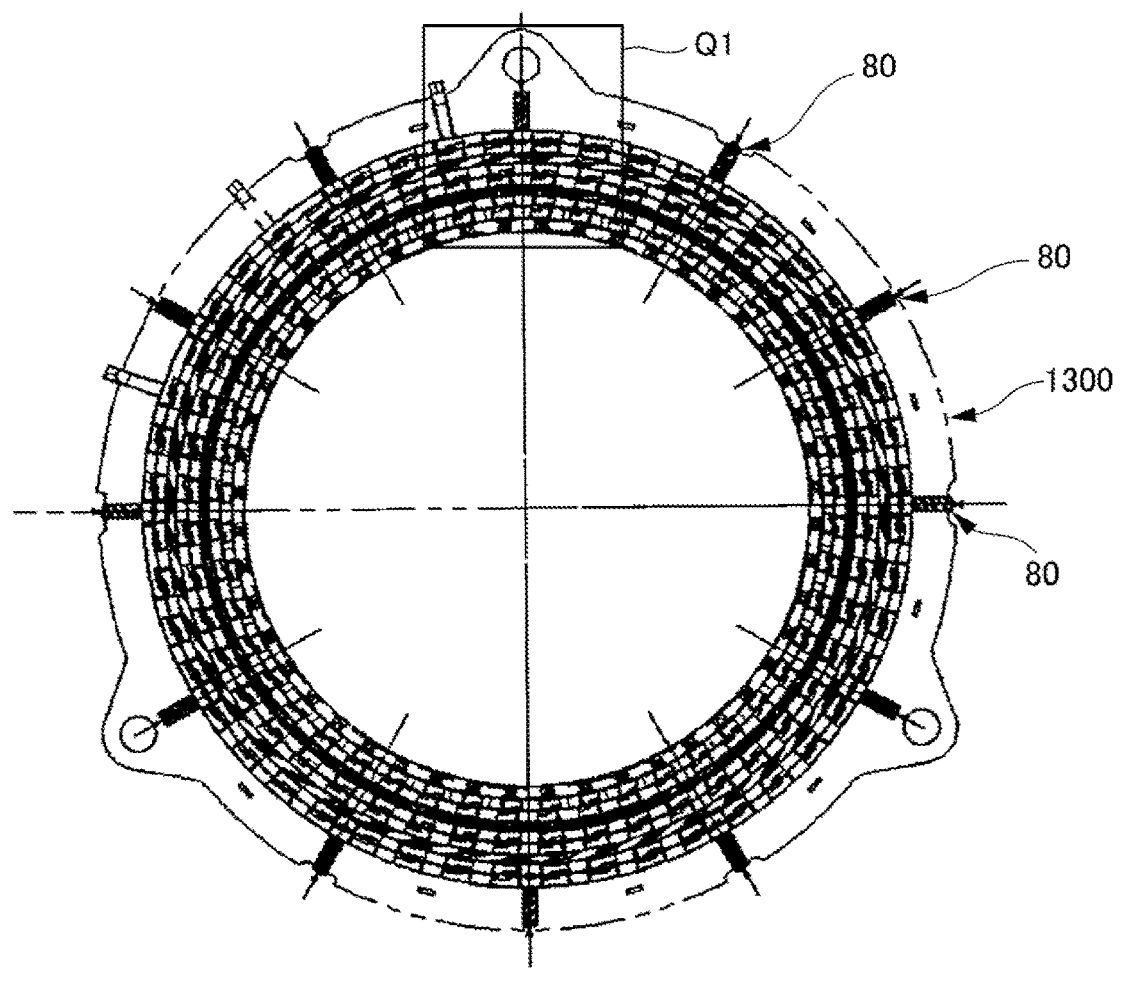
FIG. 12 is an explanatory diagram of a flow of a workpiece between the plurality of stations.
FIG. 13A is a diagram schematically showing disposition of a jig in top view of a workpiece.

FIG. 10 is a flowchart showing the flow of each process in the joining process (step S22 in FIG. 9). FIG. 11 is an explanatory diagram of FIG. 10, and is an explanatory diagram of a plurality of stations ST1 to ST4. FIG. 12 is an explanatory diagram of FIG. 10, and is an explanatory diagram of the flow of the workpiece between the plurality of stations ST1 and ST4. FIG. 12 shows workpieces treated in each of the stations ST1 to ST4 in each state in time series starting from a state 1 and transitioning to a state 2, a state 3, and the like.

In the present example, the joining process is achieved by using the four stations ST1 to ST4 as an example. Note that the number of stations is arbitrary as long as it is two or more. A workpiece is carried in to each of the stations ST1 to ST4. Here, the workpiece is a workpiece for assembling the stator, and specifically, is a workpiece to be treated in step S22 of FIG. 9.

Referring to FIG. 10, first, in step S220, the workpiece is carried in to each of the stations ST1 to ST4. The workpieces to be carried in to each of the stations ST1 to ST4 are different workpieces individually. For example, a state 4 subsequent to the state 3 in the example shown in FIG. 12 is a state in which carry-in of a workpiece k4 to the station ST1 is completed, carry-in of a workpiece k3 to the station ST2 is completed, carry-in of a workpiece k2 to the station ST3 is completed, and carry-in of a workpiece k1 to the station ST4 is completed. Note that the carry-in timing of the corresponding workpiece to each of the stations ST1 to ST4 is preferably the same, but may have a significant time difference.

In subsequent step S222, in the stations ST1 to ST4, a predetermined process assigned to the respective stations ST1 to ST4 is executed. In the present example, as an example, the station ST1 is assigned with the first welding process, and the first welding process is a process of completing the welding of the first part of the stator coil 24 in the workpiece. The station ST2 is assigned with the second welding process, and the second welding process is a process of completing the welding of the second part of the stator coil 24 in the workpiece. The station ST3 is assigned with the third welding process, and the third welding process is a process of completing the welding of the third part of the stator coil 24 in the workpiece. The station ST4 is assigned with the fourth welding process, and the fourth welding process is a process of completing the welding of the fourth part of the stator coil 24 in the workpiece.

The first part to the fourth part of the stator coil 24 are, for example, parts different from one another, and the first part to the fourth part can be arbitrarily divided. In the present example, as an example, the first part of the stator coil 24 is the coil pieces 52 of the first turn and the second turn, the second part of the stator coil 24 is the coil pieces 52 of the third turn and the fourth turn, the third part of the stator coil 24 is the coil pieces 52 of the fifth turn and the sixth turn, and the fourth part of the stator coil 24 is the coil pieces 52 related to the power line and the neutral line of the stator coil 24. In another example, the first part of the stator coil 24 may be the coil pieces 52 of the first turn to the sixth turn inserted into the slot 220 of a first group, the second part of the stator coil 24 may be the coil pieces 52 of the first turn to the sixth turn inserted into the slot 220 of a second group different from the first group, the third part of the stator coil 24 may be the coil pieces 52 of the first turn to the sixth turn inserted into the slot 220 of a third group different from the first group and the second group, and the fourth part of the stator coil 24 may be the coil pieces 52 related to the power line and the neutral line of the stator coil 24.

In subsequent step S224, in each of the stations ST1 to ST4, the workpiece for which the welding process assigned to the respective station is completed is carried out to the next process. For example, at the time of transition from the state 4 to a state 5 in the example shown in FIG. 12, the workpiece k4 for which welding in the first welding process is completed is carried out from the station ST1, the workpiece k3 for which welding in the second welding process is completed is carried out from the station ST2, the workpiece k2 for which welding in the third welding process is completed is carried out from the station ST3, and the workpiece k1 for which welding in the fourth welding process is completed is carried out from the station ST4. In this case, a new workpiece k5 is carried in to the station ST1, the workpiece k4 for which welding in the first welding process is completed is carried in to the station ST2, the workpiece k3 for which welding in the second welding process is completed is carried in to the station ST3, and the workpiece k2 for which welding in the third welding process is completed is carried in to the station ST4.

Note that the execution timings of step S224 and next step S222 are preferably the same, but may have a significant time difference.

In this way, according to the examples shown in FIGS. 10 to 12, welding in the joining process (step S22 in FIG. 9) is achieved for each workpiece via the plurality of stations ST1 to ST4.

Next, each welding process of the first welding process to the fourth welding process will be described in detail. Hereinafter, when referring to one arbitrary welding process that is not limited to a specific welding process among the first welding process to the fourth welding process, it is also simply referred to as "welding process".

Figure 13B:
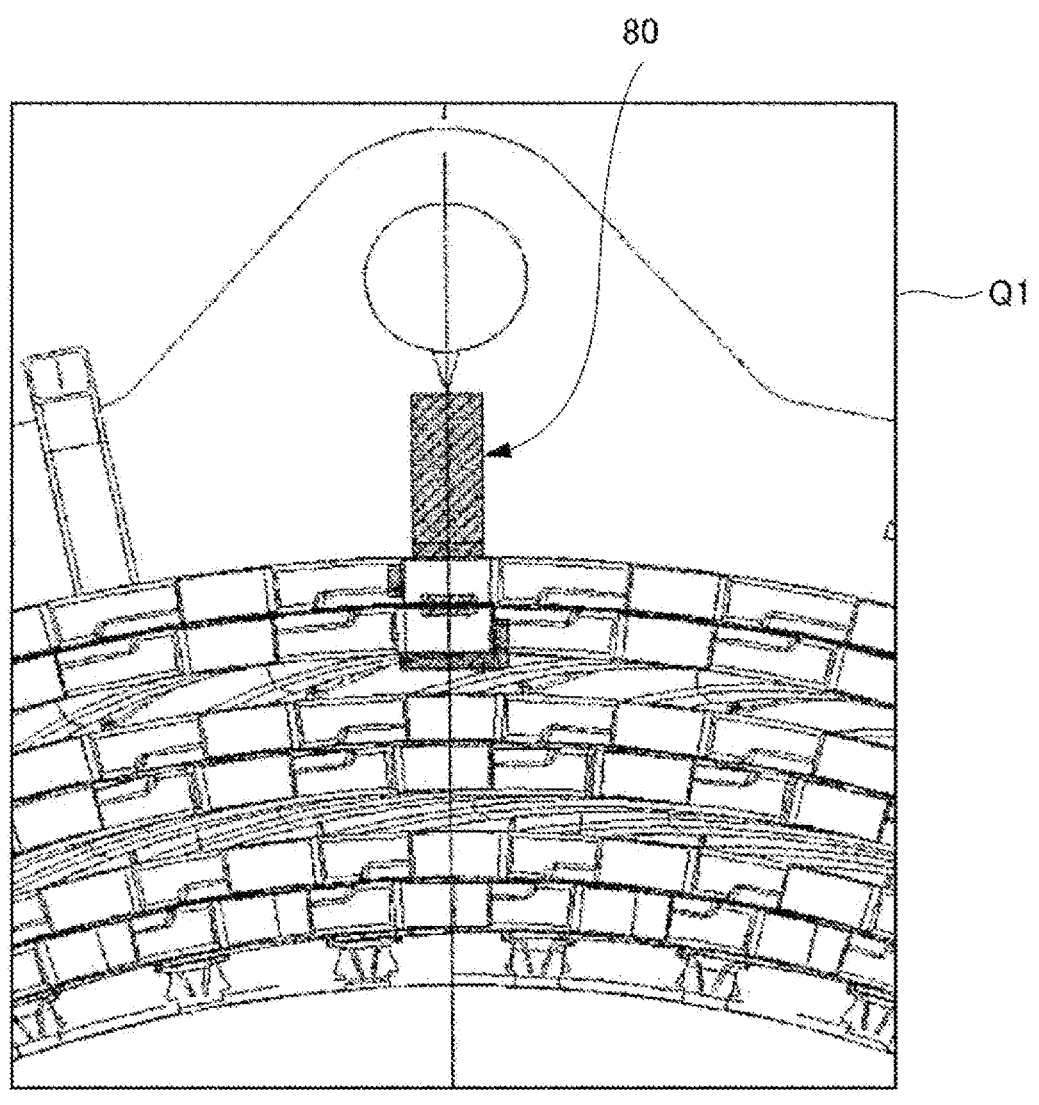
FIG. 13B is an enlarged diagram of Q1 part of FIG. 13A.

FIGS. 13A and 13B are explanatory diagrams of a jig 80 applicable in the first welding process, FIG. 13A is a diagram schematically showing the disposition of the jig 80 in a top view of a workpiece 1300, and FIG. 13B is an enlarged diagram of Q1 part of FIG. 13A. In FIGS. 13A and 13B, for easy understanding, the jig 80 is hatched although not in a cross-sectional view. The workpiece 1300 shown in FIG. 13A and the like can correspond to any one of the workpieces k1 to k5 shown in FIG. 12, for example.

The jig 80 holds the tip end parts 40 of the coil pieces 52 of the welding target in a state of abutting on each other. The jig 80 provided in the station ST1 holds the tip end parts 40 of the coil pieces 52 of the first turn and the coil pieces 52 of the second turn in a state of abutting on each other. The jig 80 may function in a mode of restraining the tip end part 40 of the coil piece 52 of the welding target in the radial direction, the axial direction, and the circumferential direction. Note that the jig 80 is separately provided in each of the stations ST1 to ST4. Although not illustrated, the jig 80 provided in the station ST2 holds the tip end parts 40 of the coil pieces 52 of the third turn and the coil pieces 52 of the fourth turn in a state of abutting on each other, and the same applies to the jig 80 provided in the station ST3.

In the present example, as an example, as shown in FIG. 13A, a total of 12 jigs 80 are arranged at intervals of 30 degrees along the circumferential direction. Therefore, since there are a total of 48 sets (corresponding to 48 slots 220) of the coil pieces 52 of the welding target at the station ST1, ¼ of them are simultaneously held by the 12 jigs 80. The number of jigs 80 with respect to the number of sets of the coil pieces 52 of the welding target is arbitrary, but is desirably as large as possible from the viewpoint of improving the efficiency of the welding process. Hereinafter, the operation of the jig 80 holding the coil piece 52 of the holding target is also referred to as "chuck", and the operation of separating from the held coil piece 52 is also referred to as "unchuck".

Figure 14:
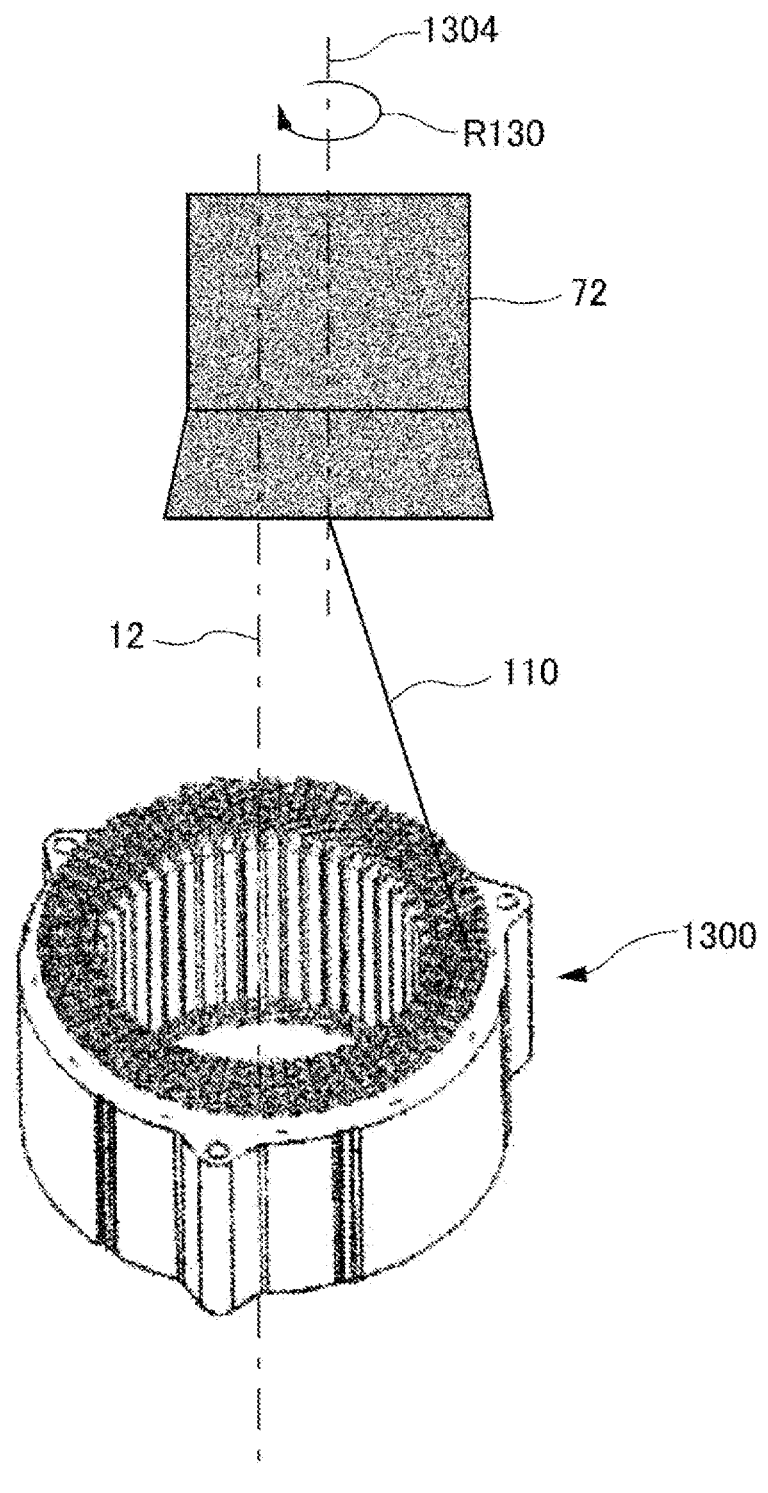
FIG. 14 is a schematic diagram showing a relationship between a laser head and a workpiece.
Figure 15A:
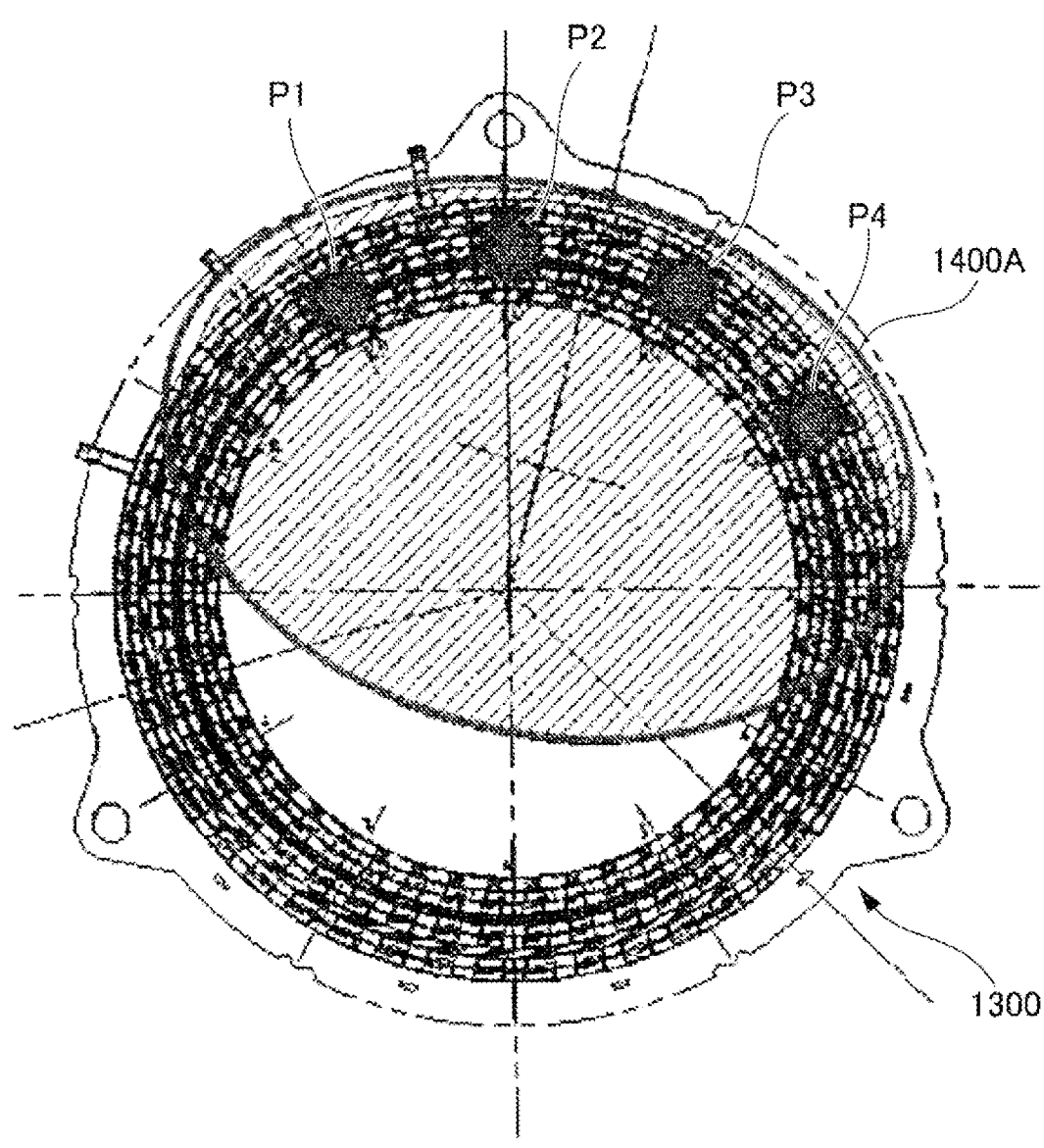
FIG. 15A is an explanatory diagram of one scan area.
Figure 15B:
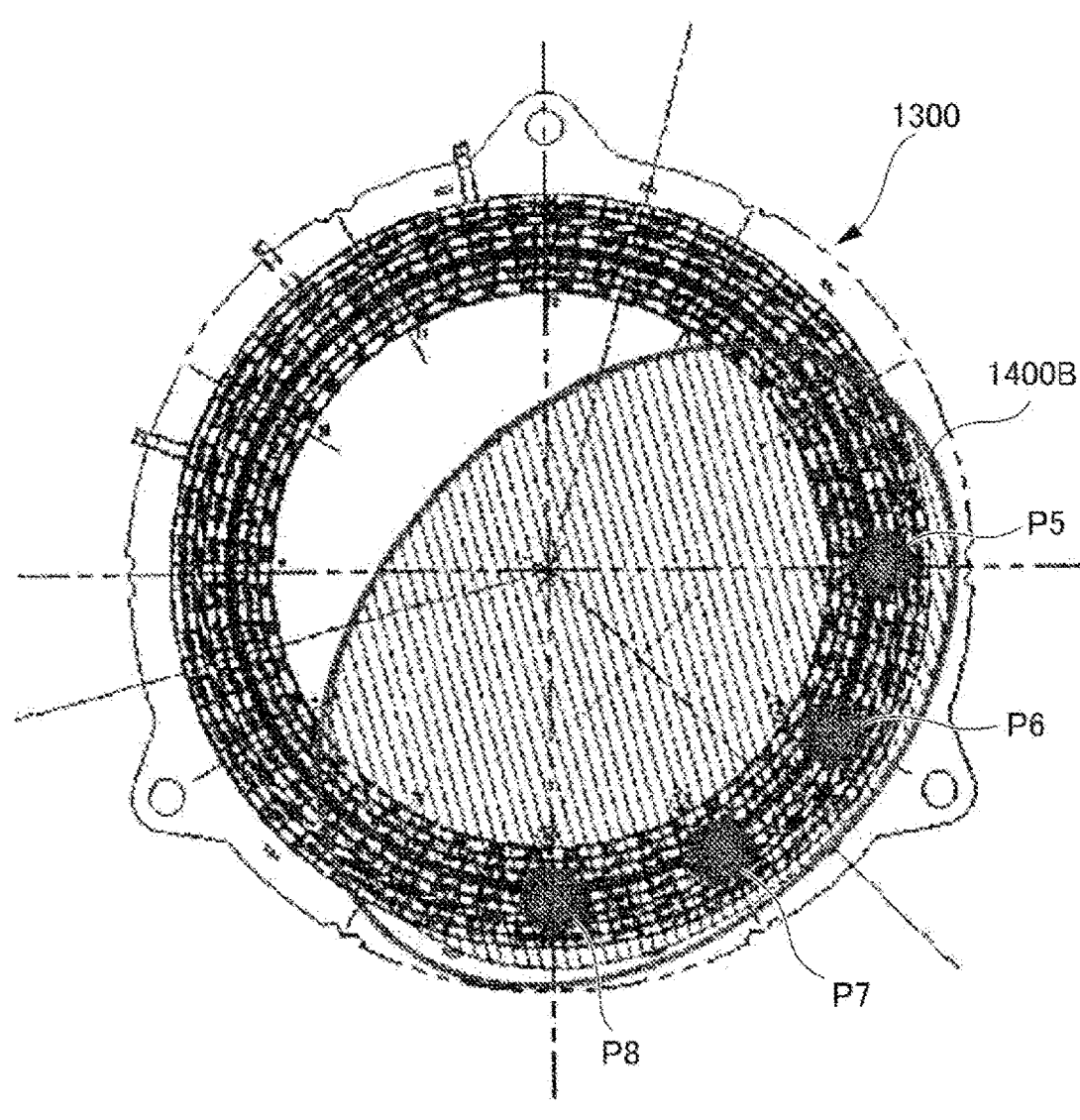
FIG. 15B is an explanatory diagram of an other one scan area.
Figure 15C:
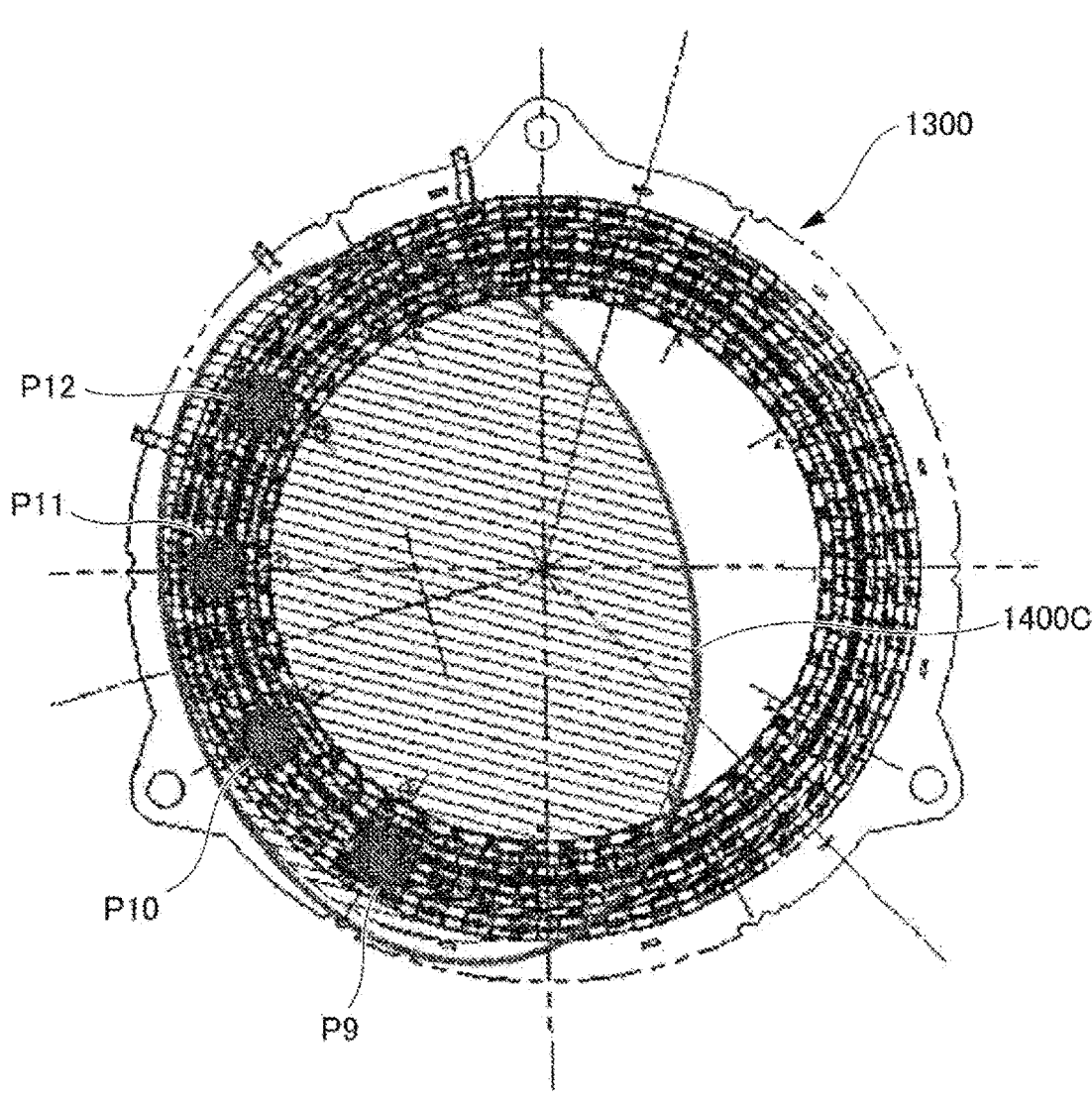
FIG. 15C is an explanatory diagram of still an other one scan area.

FIG. 14 is a schematic diagram showing the relationship between a laser head 72 and the workpiece 1300, and FIGS. 15A to 15C are explanatory diagrams of scan areas 1400A to 1400C. In FIGS. 15A to 15C, the scan areas 1400A to 1400C are indicated by hatched regions in top view of the workpiece 1300. The workpiece 1300 shown in FIG. 14 can correspond to any one of the workpieces k1 to k5 shown in FIG. 12, for example.

In the first welding process (the same applies to the second welding process to the fourth welding process), a laser beam having an arbitrary wavelength may be used, but in the present example, a green laser is used instead of an infrared laser. The green laser is a concept including not only a laser having a wavelength of 532 nm, i.e., a second harmonic generation (SHG) laser but also a laser having a wavelength close to 532 nm. In the modification, a laser having a wavelength of 0.6 μm or less that does not belong to the category of the green laser may be used. The wavelength related to the green laser is obtained by, for example, converting a basic wavelength generated by a YAG laser or a YVO4 laser through an oxide single crystal (e.g., lithium triborate: LBO).

In the case of the green laser, the absorption rate is as high as about 50% with respect to copper that is the material of the linear conductor 60 of the coil piece 52. Therefore, according to the present example, it is possible to secure a necessary joining area between the coil pieces 52 with a small amount of heat input as compared with the case of using an infrared laser.

The laser head 72 is a device capable of irradiating an irradiation position with a laser beam. When the welding target location 90 of the stator coil 24 over the entire circumference of the workpiece 1300 can be covered only by the movement (scanning) of the irradiation position, the laser head 72 may be disposed concentrically with the central axis of the workpiece 1300 (corresponding to the rotation axis 12 of the motor 1). In this case, the laser head 72 may be fixed while the welding process (step S222) is performed on one workpiece 1300. However, in the present example, the laser head 72 is assumed to be not able to cover the welding target location 90 of the stator coil 24 over the entire circumference of the workpiece 1300 only by the movement of the irradiation position of the laser beam 110, and thus is movable. In this case, the laser head 72 has a reference axis 1304 parallel to the central axis of the workpiece 1300, and the reference axis 1304 is eccentric with respect to the central axis of the workpiece 1300 as shown in FIG. 14. In this case, laser head 72 can cover the welding target location 90 of the stator coil 24 over the entire circumference of the workpiece 1300 by rotating around the central axis of the workpiece 1300 (see arrow R130 in FIG. 14).

That is, FIG. 15A shows the scan area 1400A (an example of the first area and the third area) when the laser head 72 is at a position of one certain rotation angle (an example of the first position and the third position), FIG. 15B shows the scan area 1400B (an example of the second area and the fourth area) when the laser head 72 is at a position of another one rotation angle (an example of the second position and the fourth position), and FIG. 15C shows the scan area 1400C when the laser head 72 is at a position of still another one rotation angle. In the present example, by being positioned at three different positions in this manner, the laser head 72 covers all sets (48 sets) of the coil pieces 52 of the welding target in the first welding process. Specifically, the scan areas 1400A to 1400C each share 120 degrees and cover the entire circumference of 360 degrees in cooperation. In FIGS. 15A to 15C, the angular positions covered by the scan areas 1400A to 1400C, respectively, the angular positions at which the jig 80 functions are schematically indicated as ○P1 to P12. The workpiece 1300 is rotatable about the rotation axis 12, and the jig 80 can hold all the sets by rotating 7.5 degrees three times.

Next, the relationship (cooperation) between the first welding process and the second welding process will be described. Although similar cooperation may be achieved in the third welding process and the fourth welding process, the description thereof is omitted here.

Figure 16A:
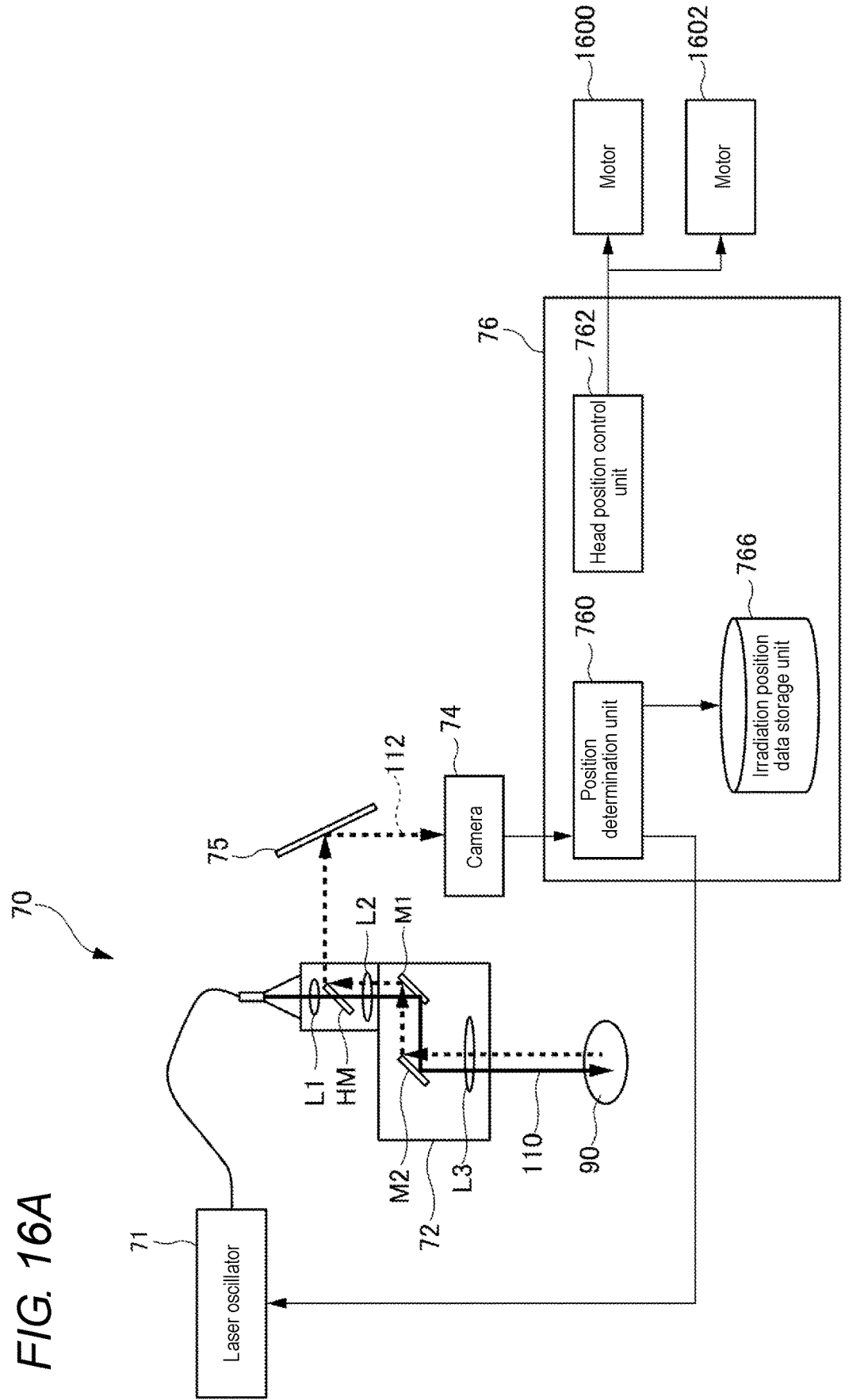
FIG. 16A is a schematic diagram showing an example of a head moving type laser irradiation device.

FIG. 16A is a schematic diagram showing an example of a head moving type laser irradiation device 70 that can be used in the present example. In FIG. 16A, paths (optical paths) of the laser beam 110 and visible light 112 are schematically shown by a solid line and a dotted line, respectively. FIG. 16A shows two motors 1600 and 1602 as a related configuration.

As shown in FIG. 16A, the laser irradiation device 70 includes a laser oscillator 71, the laser head 72, a camera 74, a processing device 76, and the like.

The laser head 72 is, for example, a galvano-scanning type laser head. The laser head 72 includes lenses L1 to L3, a half mirror HM, mirrors M1 and M2, and the like. A laser beam (seed light) is input from the laser oscillator 71 to the laser head 72. The laser head 72 generates the above-described laser beam 110 (see FIG. 5) based on the input laser beam. Specifically, the laser head 72 irradiates the welding target location 90 with the input laser beam through the lens L1, the half mirror HM, the lens L2, the mirrors M1 and M2, and the lens L3 in order. The visible light 112 reflected on the welding target location 90 is incident on the camera 74 through the lens L3, the mirror M2, the mirror M1, the lens L2, and the half mirror HM included in the laser head 72 in this order and further through a mirror 75. In this manner, the camera 74 can acquire an image including the welding target location 90 and the periphery thereof.

As described above, the camera 74 can acquire an image including the welding target location 90 and the periphery thereof. The image acquired by the camera 74 is input to the processing device 76.

The processing device 76 includes, for example, a micro-computer, and includes a position determination unit 760, a head position control unit 762, and an irradiation position data storage unit 766. Note that the position determination unit 760 and the head position control unit 762 may be implemented by, for example, a central processing unit (CPU) executing one or more programs in a storage device such as a read only memory (ROM). The irradiation position data storage unit 766 may be implemented by a ROM or an auxiliary storage device such as a hard disk drive (HDD) or a solid state drive (SSD).

The position determination unit 760 determines the laser irradiation position by processing the image from the camera 74. In the present example, as an example, it is assumed that the nominal value of the laser irradiation position corresponding to the position of the laser head 72 (see FIGS. 15A to 15C) is stored in the irradiation position data storage unit 766. In this case, the position determination unit 760 processes the image from the camera 74 to correct the nominal value of the laser irradiation position, thereby determining the final laser irradiation position. Hereinafter, such processing of the position determination unit 760 is also simply referred to as "position correction".

The head position control unit 762 controls the position of the laser head 72 via the motors 1600 and 1602. The motor 1600 generates power for rotation of the laser head 72 about the central axis of the workpiece 1300. The motor 1602 generates power for movement (described later) of the laser head 72 between the station ST1 and the station ST2.

As described above, the irradiation position data storage unit 766 stores the data of the nominal value of the laser irradiation position corresponding to the position of the laser head 72 (see FIGS. 15A to 15C).

Figure 17A:
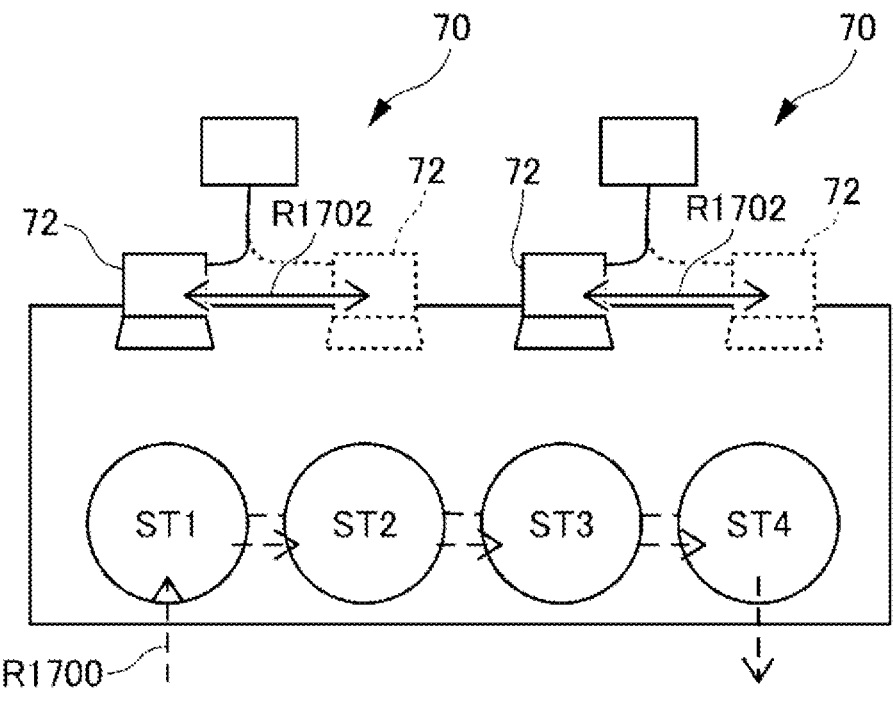
FIG. 17A is a schematic diagram of an overall configuration in a case where the head moving type laser irradiation device is applied.

According to the head moving type laser irradiation device 70 shown in FIG. 16A, as schematically shown by arrow R1702 in FIG. 17A, by moving the laser head 72 between the station ST1 and the station ST2, it is possible to share the laser oscillator 71 and the laser head 72 in the first welding process and the second welding process. That is, the laser oscillator 71 and the laser head 72 function in both the first welding process and the second welding process. This makes it possible to achieve an efficient configuration in which one set of the laser oscillator 71 and the laser head 72 cover the two stations ST1 and ST2. In FIG. 17A (the same applies to FIG. 17B described later), the flow of the workpiece 1300 passing through the stations ST1 to ST4 is schematically indicated by arrow R1700.

Figure 16B:
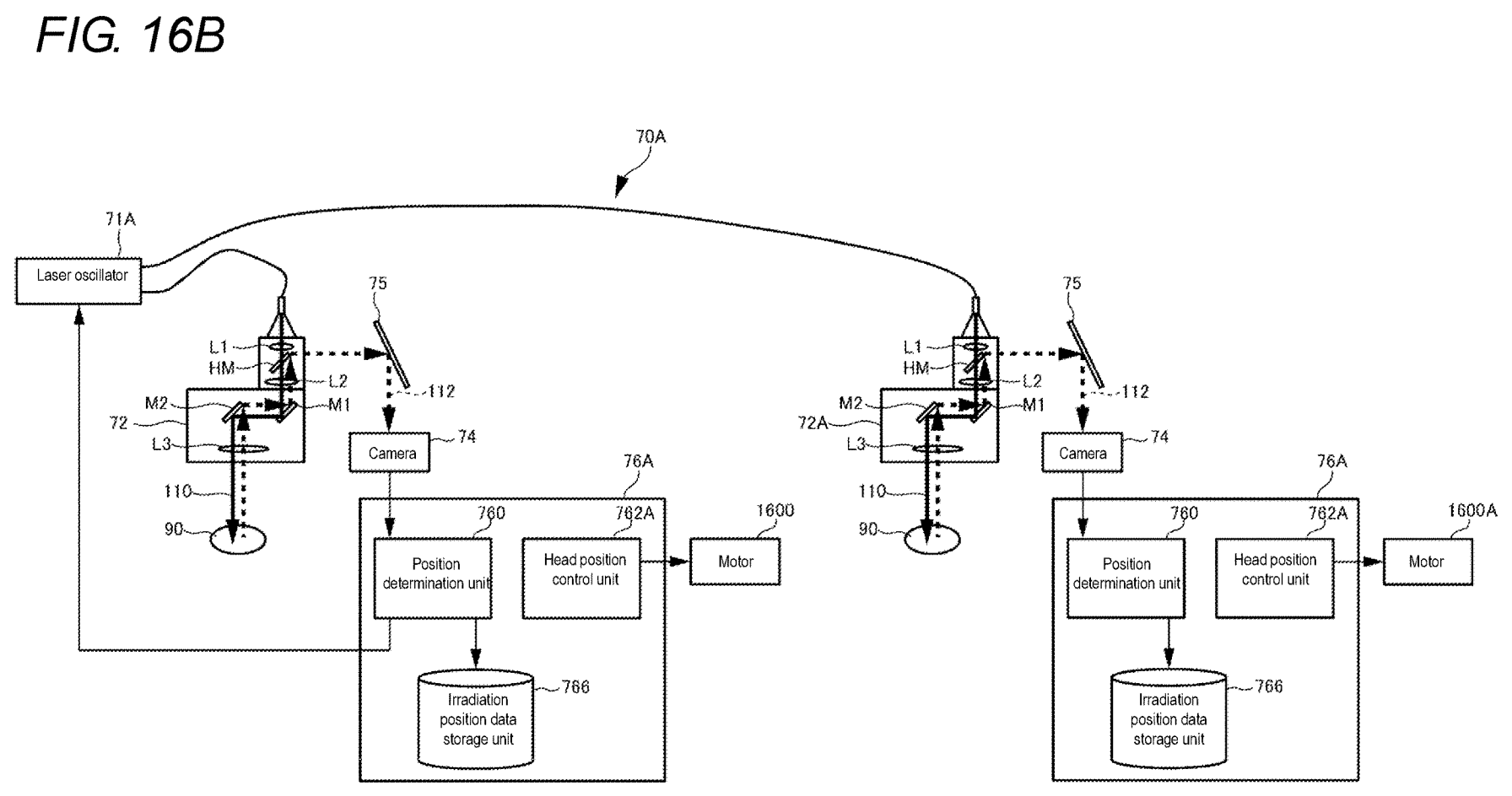

FIG. 16B is a schematic diagram showing another example of a head switching type laser irradiation device 70A that can be used in the present example. FIG. 16B schematically shows paths (optical paths) of the laser beam 110 and the visible light 112. FIG. 16B shows two motors 1600 and 1600A as a related configuration. In FIG. 16B, components that may be the same as the components shown in FIG. 16A are sometimes given the same reference numerals, and description thereof is sometimes omitted.

The laser irradiation device 70A shown in FIG. 16B is different from the head moving type laser irradiation device 70 shown in FIG. 16A in that the laser oscillator 71 is replaced with a laser oscillator 71A, the processing device 76 is replaced with a processing device 76A, and a further laser head 72A and a further processing device 76A are included for the second welding process. In this case, the laser head 72 functions only in the first welding process of the first welding process and the second welding process, and the laser head 72A functions only in the second welding process of the first welding process and the second welding process.

In the example shown in FIG. 16B, the laser head 72 is dedicated to the station ST1 and is not moved between the station ST1 and the station ST2. Therefore, in the example shown in FIG. 16B, the motor 1602 is omitted.

The laser oscillator 71A is connected to the two laser heads 72 and 72A. The laser oscillator 71A can input a laser beam to any one of the laser heads 72 and 72A in a time division manner. That is, the laser oscillator 71A has a beam switching function, and can input a laser beam to any one of the laser heads 72 and 72A.

The laser head 72A is dedicated to the station ST2 and is not moved between the station ST1 and the station ST2. Similarly to the laser head 72 described above, the laser head 72A is, for example, a galvano-scanning type laser head. A laser beam is input to the laser head 72A from the laser oscillator 71A. The laser head 72A generates the above-described laser beam 110 (see FIG. 5) based on the input laser beam. Specifically, the laser head 72A irradiates the welding target location 90 with the input laser beam through the lens L1, the half mirror HM, the lens L2, the mirrors M1 and M2, and the lens L3 in order.

The processing device 76A includes, for example, a microcomputer, and includes the position determination unit 760, a head position control unit 762A, and the irradiation position data storage unit 766. Although FIG. 16B show the two processing devices 76A for the laser head 72 and the laser head 72A, but the functions of the two processing devices 76A may be implemented by one processing device.

The head position control unit 762A of the processing device 76A for the laser head 72 controls the position of the laser head 72 via the motor 1600. The head position control unit 762A of the processing device 76A for the laser head 72A controls the position of the laser head 72A via the motor 1600A. The motor 1600A generates power for rotation (see FIG. 14) of the laser head 72A about the central axis of the workpiece 1300.

Figure 17B:
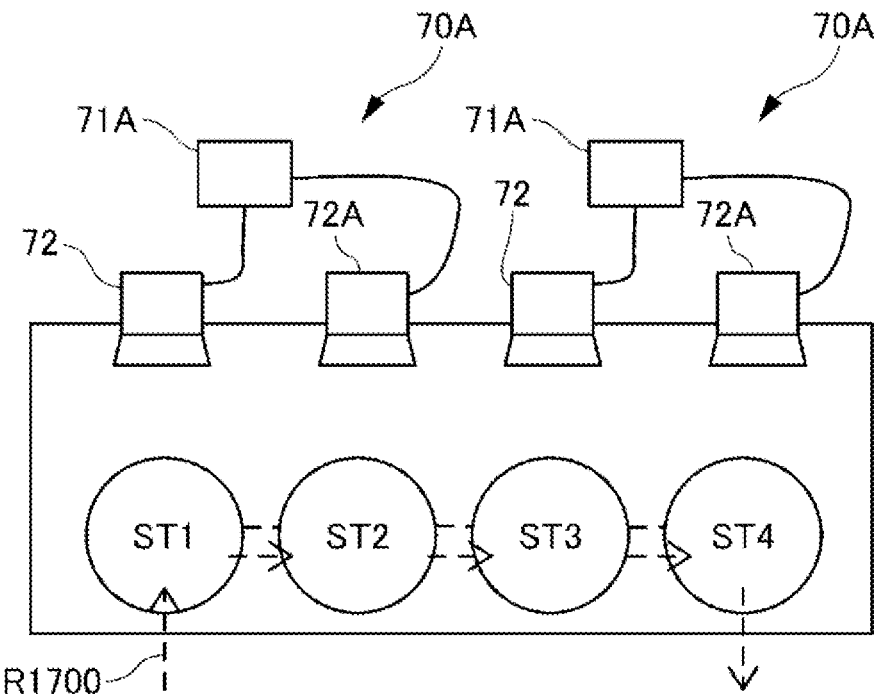
FIG. 17B is a schematic diagram of an overall configuration in a case where the head switching type laser irradiation device is applied.

According to the head switching type laser irradiation device 70A shown in FIG. 16B, as schematically shown in FIG. 17B, by switching input of the laser beam from the laser oscillator 71A between the laser head 72 for the station ST1 and the laser head 72A for the station ST2, it is possible to share the laser oscillator 71A in the first welding process and the second welding process. That is, the laser oscillator 71A functions in both the first welding process and the second welding process. This makes it possible to achieve an efficient configuration in which one laser oscillator 71A covers the two stations ST1 and ST2.

According to the present example, by using the head moving type laser irradiation device 70 shown in FIG. 16A or the head switching type laser irradiation device 70A shown in FIG. 16B, it is possible to achieve an efficient method for manufacturing the stator 21 while coordinating the first welding process at the station ST1 and the second welding process at the station ST2.

Next, a cooperation mode between the first welding process at the station ST1 and the second welding process at the station ST2 that can be achieved using the head moving type laser irradiation device 70 shown in FIG. 16A or the head switching type laser irradiation device 70A shown in FIG. 16B will be described with reference to FIG. 18 and subsequent drawings. Hereinafter, unless otherwise specified, an example using the head switching type laser irradiation device 70A shown in FIG. 16B will be described, but it is also possible to use the head moving type laser irradiation device 70 shown in FIG. 16A.

Figure 18:
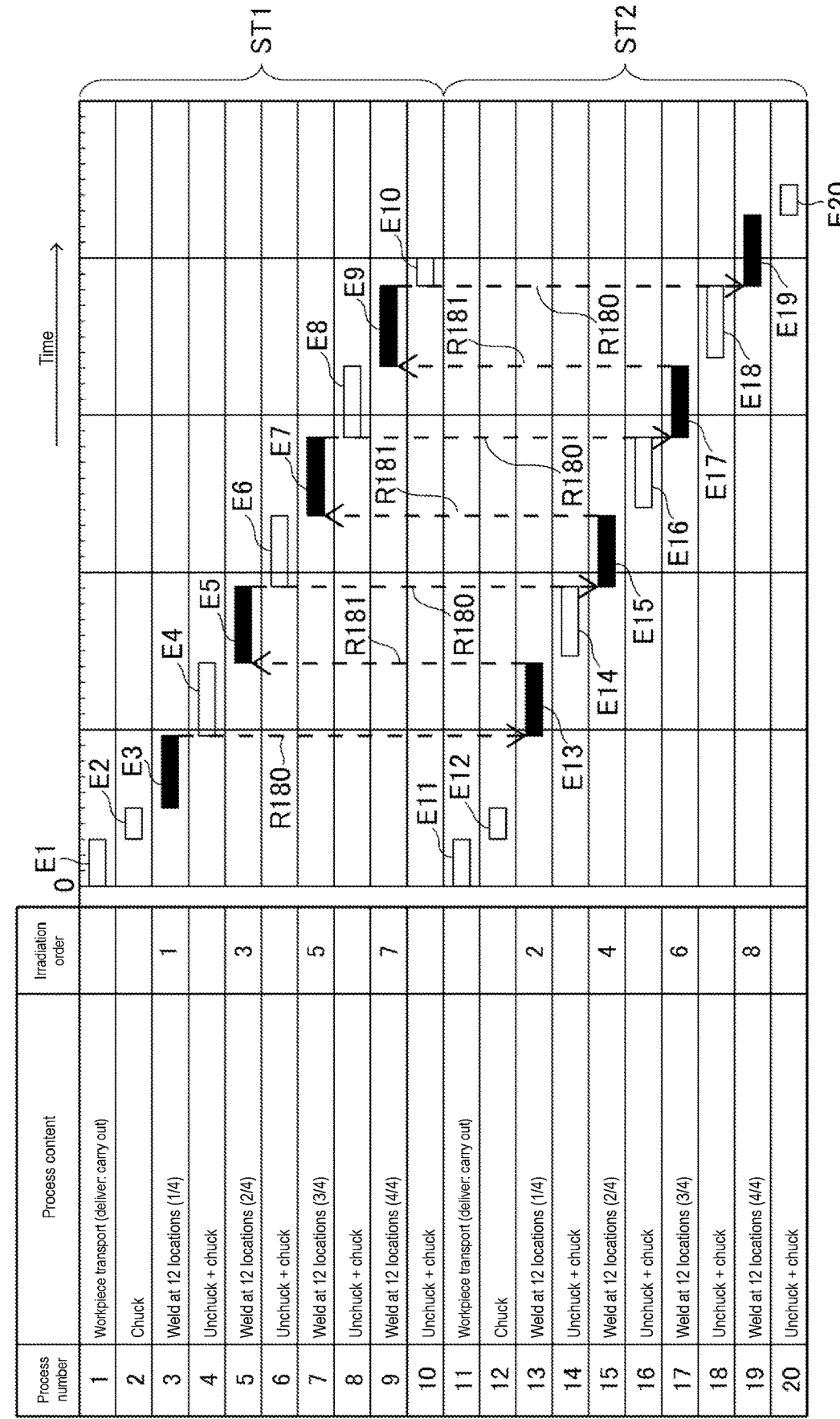
FIG. 18 is an explanatory diagram of an example of a cooperation mode between a first welding process and a second welding process.

FIG. 18 is an explanatory diagram of an example of a cooperation mode between the first welding process at the station ST1 and the second welding process at the station ST2.

FIG. 18 shows process numbers, process content, and irradiation order on the left side, and shows execution periods E1 to E20 of the processes of the respective process numbers in the respective ranges having a bar shape on the right side. The execution periods E1 to E20 of the processes of the respective process numbers are shown in time series in which time elapses toward the right side. An origin "0" of the time axis corresponds to the start time point of the processing related to one workpiece 1300. For ease of distinction, in FIG. 18 (the same applies to FIG. 19 and the like described later), among the execution periods E1 to E20, the execution periods E3, E5, E7, E9, E13, E15, E17, and E19 related to the first irradiation process and the second irradiation process are painted in black.

The process numbers 1 to 10 are various processes executed in the station ST1, and are executed in ascending order of the process numbers. The process numbers 11 to 20 are various processes executed in the station ST2, and are executed in ascending order of the process numbers.

Specifically, in the station ST1, first, the first disposing process of the process number 1 is executed. In the first disposing process, one new workpiece 1300 is carried in to the station ST1, and one workpiece 1300 after completion of welding is carried out from the station ST1 to the station ST2 (see E1). In this case, by equalizing the working time in each station, it is possible to achieve an efficient mode of simultaneously achieving carry-in/carry-out of the workpiece.

When the first disposing process is completed and carry-in of a new workpiece 1300 is completed, the first welding process is executed. In the first welding process, a first preparation process and the first irradiation process are executed for each of the welding target locations 90 of 12 locations among the welding target locations 90 of 48 locations related to between the first turn and the second turn. The first preparation process is a preparation process for performing the first irradiation process. That is, first, as the first preparation process of the process number 2, the coil pieces 52 related to the welding target locations 90 of the first 12 locations are chucked by the jig 80 (an example of the first jig) of the station ST1 (see E2) (see FIG. 13A), and then, as the first irradiation process of the process number 3, welding is executed on the welding target locations 90 of the 12 locations related to the chucked coil pieces 52 (see E3). In the first irradiation process, the laser head 72 sequentially irradiates the welding target locations 90 of the 12 locations with the laser beam 110 while sequentially changing the scan area (see FIGS. 15A to 15C). Next, as the first preparation process of the process number 4, after unchucked, the workpiece 1300 is rotated by 7.5 degrees, and after the rotation, the coil pieces 52 related to the welding target locations 90 of next another 12 locations are chucked by the jig 80 (see E4), and then welding is similarly executed as the first irradiation process of the process number 5 (see E5). In this way, the first preparation process and the first irradiation process are repeated for every 12 locations (see E6 to E9), and when the welding of the welding target locations 90 of all the 48 locations is completed, the first welding process of the workpiece 1300 is ended by the unchucking (see E10).

Also at the station ST2, processes similar to those at the station ST1 are executed.

Specifically, in the station ST2, first, the second disposing process of the process number 11 is executed. In the second disposing process, one new workpiece 1300 (the workpiece 1300 from the station ST1) is carried in to the station ST2, and one workpiece 1300 after completion of welding is carried out from the station ST2 to the station ST3 (see E11). In this case, by equalizing the working time in each station, it is possible to achieve an efficient mode of simultaneously achieving carry-in/carry-out of the workpiece.

When the second disposing process is completed and carry-in of a new workpiece 1300 is completed, the second welding process is executed. In the second welding process, a second preparation process and the second irradiation process are executed for each of the welding target locations 90 of 12 locations among the welding target locations 90 of 48 locations between the third turn and the fourth turn. The second preparation process is a preparation process for performing the second irradiation process. That is, first, as the second preparation process of the process number 12, the coil pieces 52 related to the welding target locations 90 of the first 12 locations are chucked by the jig 80 (an example of the second jig) of the station ST2 (see E12) (see FIG. 13A), and then, as the second irradiation process of the process number 13, welding is executed on the welding target locations 90 of the 12 locations related to the chucked coil pieces 52 (see E13). In the second irradiation process, the laser head 72A sequentially irradiates the welding target locations 90 of the 12 locations with the laser beam 110 while sequentially changing the scan area (see FIGS. 15A to 15C). Next, as the second preparation process of the process number 14, after unchucked, the workpiece 1300 is rotated by 7.5 degrees, and after the rotation, the coil pieces 52 related to the welding target locations 90 of next another 12 locations are chucked by the jig 80 (see E14), and then welding is similarly executed as the second irradiation process of the process number 15 (see E15). In this way, the second preparation process and the second irradiation process are repeated for every 12 locations (see E16 to E19), and when the welding of the welding target locations 90 of all the 48 locations is completed, the second welding process of the workpiece 1300 is ended by the unchucking (see E20).

Here, in the example shown in FIG. 18, as indicated by the execution periods E1 to E20 in FIG. 18, the first irradiation process and the second irradiation process have a time difference. For example, the second irradiation process of the process number 13 is performed subsequently to the first irradiation process of the process number 3 (see dotted arrow R180), the first irradiation process of the process number 5 is performed subsequently to the second irradiation process of the process number 13 (see dotted arrow R181), and the same applies hereinafter.

In this way, according to the example shown in FIG. 18, the first irradiation process and the second irradiation process are executed in a mode having a time difference, and therefore the first irradiation process and the second irradiation process can be achieved using the head switching type laser irradiation device 70A shown in FIG. 16B. That is, the laser beam 110 used in each of the first irradiation process and the second irradiation process is generated based on the same laser oscillator 71A. This allows the efficient first welding process and second welding process to be performed using the common laser oscillator 71A.

In the example shown in FIG. 18, in order for the first irradiation process and the second irradiation process to have a time difference, the second irradiation process of the process number 13 is executed after waiting for a time corresponding to the time difference after completion of the second preparation process of the preceding process number 12 (preparation process executed in parallel with the first preparation process of the process number 2). However, in the modification, as long as a similar time difference can be formed, the second preparation process of the process number 12 may also be executed in a mode having a time difference with respect to the first preparation process of the process number 2.

In the example shown in FIG. 18, the first irradiation process and the second irradiation process are performed in a mode where the first irradiation process is performed simultaneously with the second preparation process and the second irradiation process is performed simultaneously with the first preparation process. That is, the first preparation processes of the process numbers 4, 6, and 8 are performed using the execution periods E13, E15, and E17, respectively, of the second irradiation process, and the second preparation processes of the process numbers 12, 14, 16, and 18 is performed using the execution periods E3, E5, E7, and E9, respectively, of the first irradiation process. This makes it possible to minimize the waiting time at the time of switching between the first irradiation process and the second irradiation process.

In this regard, in the example shown in FIG. 18, the first irradiation process and the second irradiation process are continuously performed in a mode where the second irradiation process is started immediately after the first irradiation process is completed. That is, the waiting time at the time of switching between the first irradiation process and the second irradiation process is substantially 0. In this case, the laser oscillator 71A alternately inputs laser beams (seed light) to the laser heads 72 and 72A by the beam switching function substantially without a stopping period. That is, in the example shown in FIG. 18, by using the head switching type laser irradiation device 70A shown in FIG. 16B, the process (see arrows R180 and R181) of switching between the first state in which the laser oscillator 71A and the laser head 72 (an example of the first laser head) are connected and the second state in which the laser oscillator 71A and the laser head 72A (an example of the second laser head) are connected is achieved substantially without a stopping period of the laser oscillator 71A. However, in the modification, the first irradiation process and the second irradiation process may be performed in a mode where the second irradiation process is started immediately after completion of the first irradiation process via a slight stopping period.

In the example shown in FIG. 18, the first irradiation processes of the process numbers 5, 7, and 9 are each executed in parallel with the second preparation process of the corresponding process number among the process numbers 14, 16, and 18 over the entire execution period, but the present disclosure is not limited thereto. That is, the mode in which the first irradiation process is performed simultaneously with the second preparation process is arbitrary, and a part or entirety of the first irradiation process may be performed simultaneously with a part or entirety of the second preparation process. The same applies to the second irradiation process.

Furthermore, in the example shown in FIG. 18, the first preparation process and the second preparation process may include position correction by the position determination unit 760 described above. The position correction by the position determination unit 760 described above may be executed after chucking by the jig 80. In this case, every time the workpiece 1300 rotates by 7.5 degrees, the position correction may be collectively executed for the welding target locations 90 (i.e., the welding target locations 90 of the 12 locations) related to all the scan areas. Alternatively, the position correction by the position determination unit 760 described above may be executed when the scan area is changed in the first welding process and the second welding process. In this case, the position correction for 8 locations of the 12 positions is executed when the scan area is changed in the first welding process and the second welding process.

In the example shown in FIG. 18, the head switching type laser irradiation device 70A shown in FIG. 16B is used, but as described above, the head moving type laser irradiation device 70 shown in FIG. 16A may be used. In this case, a process of moving the laser head 72 between the station ST1 and the station ST2 is only required to be achieved at the time of switching indicated by arrows R180 and R181.

The jig 80 provided in the station ST1 described above holds the coil pieces 52 related to the two turns (in the case of the station ST1, the first turn and the second turn) as described above with reference to FIGS. 13A and 13B, but the jig applicable to the present example is not limited to such the jig 80. For example, the jig provided in the station ST1 may be achieved by combination of a jig (hereinafter, also referred to as "jig 80A") that holds the coil pieces 52 related to the first turn and the second turn, a jig (hereinafter, also referred to as "jig 80B") that holds the coil pieces 52 related to the third turn and the fourth turn, and a third jig (hereinafter, also referred to as "jig 80C") that holds the coil pieces 52 related to the fifth turn and the sixth turn.

Next, a case where the jigs 80A to 80C described above are provided in each of the station ST1 and the station ST2 will be described. In this case, each of the station ST1 and the station ST2 can simultaneously hold (chuck) the coil pieces 52 related to the welding target locations 90 at a total of 48 locations including the 12 locations between the first turn and the second turn, the 12 locations between the third turn and the fourth turn, and the 12 locations between the fifth turn and the sixth turn.

Hereinafter, for the sake of distinction, such type of jig is also referred to as "6-turn holding type jig", and the type of jig 80 described above with reference to FIGS. 13A and 13B is also referred to as "2-turn holding type jig 80".

In the case of using the 6-turn holding type jig, more coil pieces 52 can be held than in the case of using the 2-turn holding type jig 80, and therefore the time required for the welding process can be shortened accordingly. In the present example, the welding target locations 90 of the 48 locations related to between the first turn and the second turn, the welding target locations 90 of the 48 locations related to between the third turn and the fourth turn, and the welding target locations 90 of the 48 locations related to between the fifth turn and the sixth turn are the welding target locations 90 in the general part (the parts other than the part related to the neutral point and the part related to the power line), and the total number is 48×3=244 locations.

Therefore, in the case of using the 2-turn holding type jig 80, 244/12=12 times of chucking by the jig 80 are required in cooperation at the stations ST1 to ST3. As a result, in each of the stations ST1 to ST3, the chuck using the jig 80 may be executed 12/3=4 times (see FIG. 18).

On the other hand, in the case of using the 6-turn holding type jig, 244/36=4 times of chucking by the 6-turn holding type jig are required in cooperation at the stations ST1 to ST3. In this case, in order to equalize the time of each welding process in each of the stations ST1 to ST3, chucking by the 6-turn holding type jig may be executed twice in each of the stations ST1 to ST3 (see FIG. 18). In this case, one time of the two times may involve performing of welding of all of the scan areas 1400A to 1400C, and the other one time may involve performing of welding of one of the scan areas 1400A to 1400C (see FIG. 18).

FIG. 19 is an explanatory diagram of an example of a cooperation mode between the first welding process at the station ST1 and the second welding process at the station ST2 that can be achieved using the 6-turn holding type jig. Similarly to FIG. 18 described above, FIG. 19 shows process numbers, process content, and irradiation order on the left side, and shows execution periods E22 to E42 of the processes of the respective process numbers in the respective ranges having a bar shape on the right side. The execution periods E22 to E42 of the processes of the respective process numbers are shown in time series in which time elapses toward the right side. Note that, in FIG. 19, the scan areas 1400A to 1400C are denoted by "scan areas A to C", respectively.

The process numbers 22 to 31 are various processes executed in the station ST1, and are executed in ascending order of the process numbers. In this case, the process numbers 22 to 29 (see reference numeral 1900) relate to the welding target locations 90 of 36 locations (all of the scan areas 1400A to 1400C), and the process numbers 30 and 31 (see reference numeral 1903) relate to 12 locations (scan area 1400A among the scan areas 1400A to 1400C) among the welding target locations 90 of the 36 locations.

The process numbers 33 to 42 are various processes executed in the station ST2, and are executed in ascending order of the process numbers. In this case, the process numbers 33 to 40 (see reference numeral 1902) relate to the welding target locations 90 of 36 locations (all of the scan areas 1400A to 1400C), and the process numbers 41 and 42 (see reference numeral 1904) relate to 12 locations (scan area 1400B among the scan areas 1400A to 1400C) among the welding target locations 90 of the 36 locations.

Specifically, in the station ST1, first, the first disposing process of the process number 22 is executed. In the first disposing process, one new workpiece 1300 is carried in to the station ST1, and one workpiece 1300 after completion of welding is carried out from the station ST1 to the station ST2 (see E22).

When the first disposing process is completed and carry-in of a new workpiece 1300 is completed, the first welding process is executed. In the first welding process, the first preparation process and the first irradiation process are executed for each of the welding target locations 90 of 12 locations among the welding target locations 90 of 48 locations in the first welding process. That is, first, as the first preparation process of the process number 23, chucking at the 36 locations are performed by using the 6-turn holding type jig (an example of the first jig) of the station ST1, and position correction regarding the welding target locations 90 of the first 12 locations in the scan area 1400A (FIG. 15A) is performed (see E23). Next, as the first irradiation process of the process number 24, welding is executed on the welding target locations 90 (in the scan area 1400A) of the 12 locations related to the chucked coil pieces 52 (see E24). In the first irradiation process, the laser head 72 sequentially irradiates the welding target locations 90 of the 12 locations with the laser beam 110 in a state of fixing the scan area to the scan area 1400A (FIG. 15A). Next, as the first preparation process of the process number 25, rotation of the laser head 72 by 120 degrees (see FIG. 14) is performed in order to switch the scan area from the scan area 1400A (FIG. 15A) to the scan area 1400B (FIG. 15B), position correction regarding the welding target locations 90 of the next 12 locations in the scan area 1400B (FIG. 15B) is executed (see E25), and then welding is similarly executed as the first irradiation process of the process number 26 (see E26). In this way, the first preparation process and the first irradiation process are repeated for every 12 locations (see E27 and E28), and when the welding of the welding target locations 90 of the 36 locations is completed, the first preparation process of the process number 29 is executed. In the first preparation process of the process number 29, after unchucked, the workpiece 1300 is rotated (e.g., 7.5 degrees anticlockwise), and after the rotation, the workpiece is chucked (see E29). As the first preparation process of the process number 30, position correction regarding the welding target locations 90 of the 12 locations in the scan area 1400A (FIG. 15A) is performed (see E30). Next, as the first irradiation process of the process number 31, welding is executed on the welding target locations 90 (in the scan area 1400A) of the 12 locations related to the chucked coil pieces 52 (see E31). In this way, the first preparation process and the first irradiation process are repeated for every 12 locations (see E23 to E31), and when the welding of the welding target locations 90 of all the 48 locations is completed, the first welding process of the workpiece 1300 is ended by the unchucking (not illustrated in FIG. 19, see E20 in FIG. 18).

Also at the station ST2, processes similar to those at the station ST1 are executed.

Specifically, in the station ST2, first, the second disposing process of the process number 33 is executed. In the second disposing process, one new workpiece 1300 (the workpiece 1300 from the station ST1) is carried in to the station ST2, and one workpiece 1300 after completion of welding is carried out from the station ST2 to the station ST3 (see E33). At this time, here, as an example, the workpiece 1300 is assumed to be disposed in a state of being rotated by 15 degrees clockwise with respect to the state at the station ST1.

When the second disposing process is completed and carry-in of a new workpiece 1300 is completed, the second welding process is executed. In the second welding process, the second preparation process and the second irradiation process are executed for each of the welding target locations 90 of 12 locations among the welding target locations 90 of 48 locations in the second welding process. That is, first, as the second preparation process of the process number 34, chucking at the 36 locations are performed by using the 6-turn holding type jig (an example of the second jig) of the station ST2, and position correction regarding the welding target locations 90 of the first 12 locations in the scan area 1400A (FIG. 15A) is performed (see E34). Next, as the second irradiation process of the process number 35, welding is executed on the welding target locations 90 (in the scan area 1400A) of the 12 locations related to the chucked coil pieces 52 (see E35). In the second irradiation process, the laser head 72A sequentially irradiates the welding target locations of the 12 locations with the laser beam 110 in a state of fixing the scan area to the scan area 1400A (FIG. 15A). Next, as the second preparation process of the process number 36, rotation of the laser head 72A by 120 degrees (see FIG. 14) is performed in order to switch the scan area from the scan area 1400A (FIG. 15A) to the scan area 1400B (FIG. 15B), position correction regarding the welding target locations 90 of the next 12 locations in the scan area 1400B (FIG. 15B) is executed (see E36), and then welding is similarly executed as the second irradiation process of the process number 37 (see E37). In this way, the second preparation process and the second irradiation process are repeated for every 12 locations (see E38 and E39), and when the welding of the welding target locations 90 of the 36 locations is completed, the second preparation process of the process number 40 is executed. In the second preparation process of the process number 40, after unchucked, the workpiece 1300 is rotated (e.g., 15 degrees anticlockwise), and after the rotation, the workpiece is chucked (see E40). As the second preparation process of the process number 41, position correction regarding the welding target locations 90 of the 12 locations in the scan area 1400A (FIG. 15A) is performed (see E41). Next, as the second irradiation process of the process number 42, welding is executed on the welding target locations 90 (in the scan area 1400A) of the 12 locations related to the chucked coil pieces 52 (see E42). In this way, the second preparation process and the second irradiation process are repeated for every 12 locations (see E23 to E31), and when the welding of the welding target locations 90 of all the 48 locations is completed, the second welding process of the workpiece 1300 is ended by the unchucking (not illustrated in FIG. 19, see E20 in FIG. 18).

Here, in the example shown in FIG. 19, as indicated by the execution periods E22 to E42 in FIG. 19, the first irradiation process and the second irradiation process have a time difference similarly to the example shown in FIG. 18. For example, the second irradiation process of the process number 35 is performed subsequently to the first irradiation process of the process number 24 (see dotted arrow R180), the first irradiation process of the process number 26 is performed subsequently to the second irradiation process of the process number 35 (see dotted arrow R181), and the same applies hereinafter.

In this way, according to the example shown in FIG. 19, the first irradiation process and the second irradiation process are executed in a mode having a time difference, and therefore the first irradiation process and the second irradiation process can be achieved using the head switching type laser irradiation device 70A shown in FIG. 16B. That is, the laser beam 110 used in each of the first irradiation process and the second irradiation process is generated based on the same laser oscillator 71A. This allows the efficient first welding process and second welding process to be performed using the common laser oscillator 71A.

In the example shown in FIG. 19, in order for the first irradiation process and the second irradiation process to have a time difference, the second irradiation process of the process number 35 is executed after waiting for a time corresponding to the time difference after completion of the second preparation process of the preceding process number 34 (preparation process executed in parallel with the first preparation process of the process number 23). However, in the modification, as long as a similar time difference can be formed, the second preparation process of the process number 34 may also be executed in a mode having a time difference with respect to the first preparation process of the process number 23.

In the example shown in FIG. 19, the first irradiation process and the second irradiation process are performed in a mode where the first irradiation process is performed simultaneously with the second preparation process and the second irradiation process is performed simultaneously with the first preparation process. That is, the first preparation processes of the process numbers 25, 27, and 29 are performed using the execution periods E35, E37, and E39, respectively, of the second irradiation process, and the second preparation processes of the process numbers 36, 38, and 40 (or 40) is performed using the execution periods E26, E28, and E31, respectively, of the first irradiation process. This makes it possible to minimize the waiting time at the time of switching between the first irradiation process and the second irradiation process.

In this regard, in the example shown in FIG. 19, the first irradiation process and the second irradiation process are continuously performed in a mode where the second irradiation process is started immediately after the first irradiation process is completed. That is, in the example shown in FIG. 19, by using the head switching type laser irradiation device 70A shown in FIG. 16B, the process (see arrows R180 and R181) of switching between the first state in which the laser oscillator 71A and the laser head 72 (an example of the first laser head) are connected and the second state in which the laser oscillator 71A and the laser head 72A (an example of the second laser head) are connected is achieved substantially without a stopping period of the laser oscillator 71A. However, in the modification, the first irradiation process and the second irradiation process may be performed in a mode where the second irradiation process is started immediately after completion of the first irradiation process via a slight stopping period.

In the example shown in FIG. 19, the first irradiation processes of the process numbers 26 and 28 are each executed in parallel with the second preparation process of the corresponding process numbers 36 and 38 over the entire execution period, but the present disclosure is not limited thereto. That is, the mode in which the first irradiation process is performed simultaneously with the second preparation process is arbitrary, and a part or entirety of the first irradiation process may be performed simultaneously with a part or entirety of the second preparation process. The same applies to the second irradiation process.

In the example shown in FIG. 19, the head switching type laser irradiation device 70A shown in FIG. 16B is used, but as described above, the head moving type laser irradiation device 70 shown in FIG. 16A may be used. In this case, a process of moving the laser head 72 between the station ST1 and the station ST2 is only required to be achieved at the time of switching indicated by arrows R180 and R181.

In the example shown in FIG. 19, both the first preparation process and the second preparation process include position correction by the position determination unit 760 described above, but such position correction may be omitted.

In the example shown in FIG. 19, the position correction is executed prior to the first irradiation process for each first irradiation process in the first welding process (the same applies to the second welding process). In this case, the position correction for 8 locations of the 12 positions is executed when the scan area is changed in the first welding process and the second welding process.

However, in the modification, after chucking, position correction may be collectively performed for the welding target locations 90 of the 36 locations in the three scan areas 1400A to 1400C. In this case, in the second welding process, the waiting time (length of time from the time point when the second preparation process regarding the second welding process is completed to when the first irradiation process of the first time is completed in the first welding process, hereinafter also referred to as "welding waiting time") of the second irradiation process of the first time becomes long, but the same effects as those of the example shown in FIG. 19 can be achieved. Hereinafter, such modification is also referred to as "first modification".

Figure 20A:
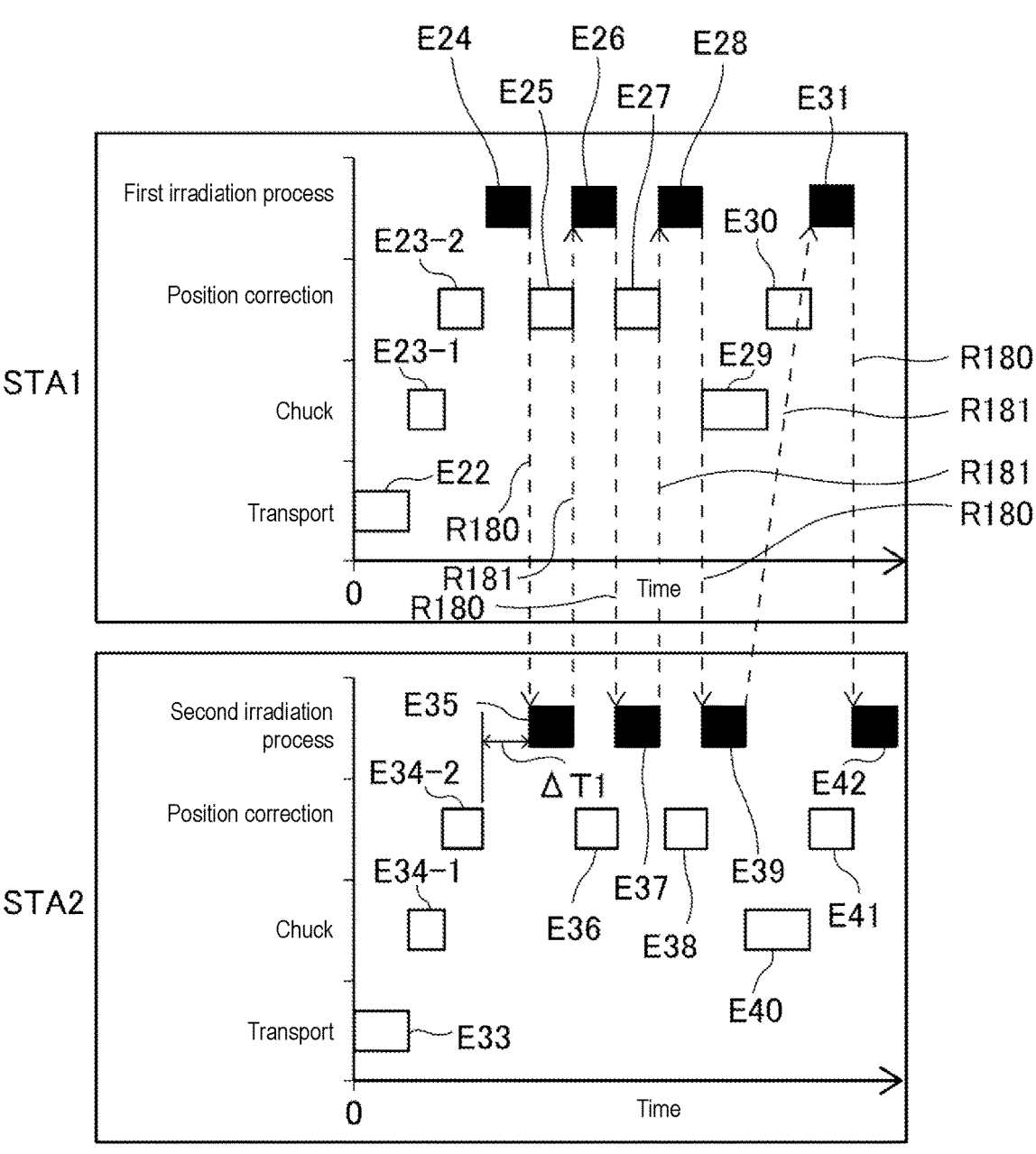
FIG. 20A is an explanatory diagram of a welding waiting time in a case of the example shown in FIG. 19.
Figure 20B:
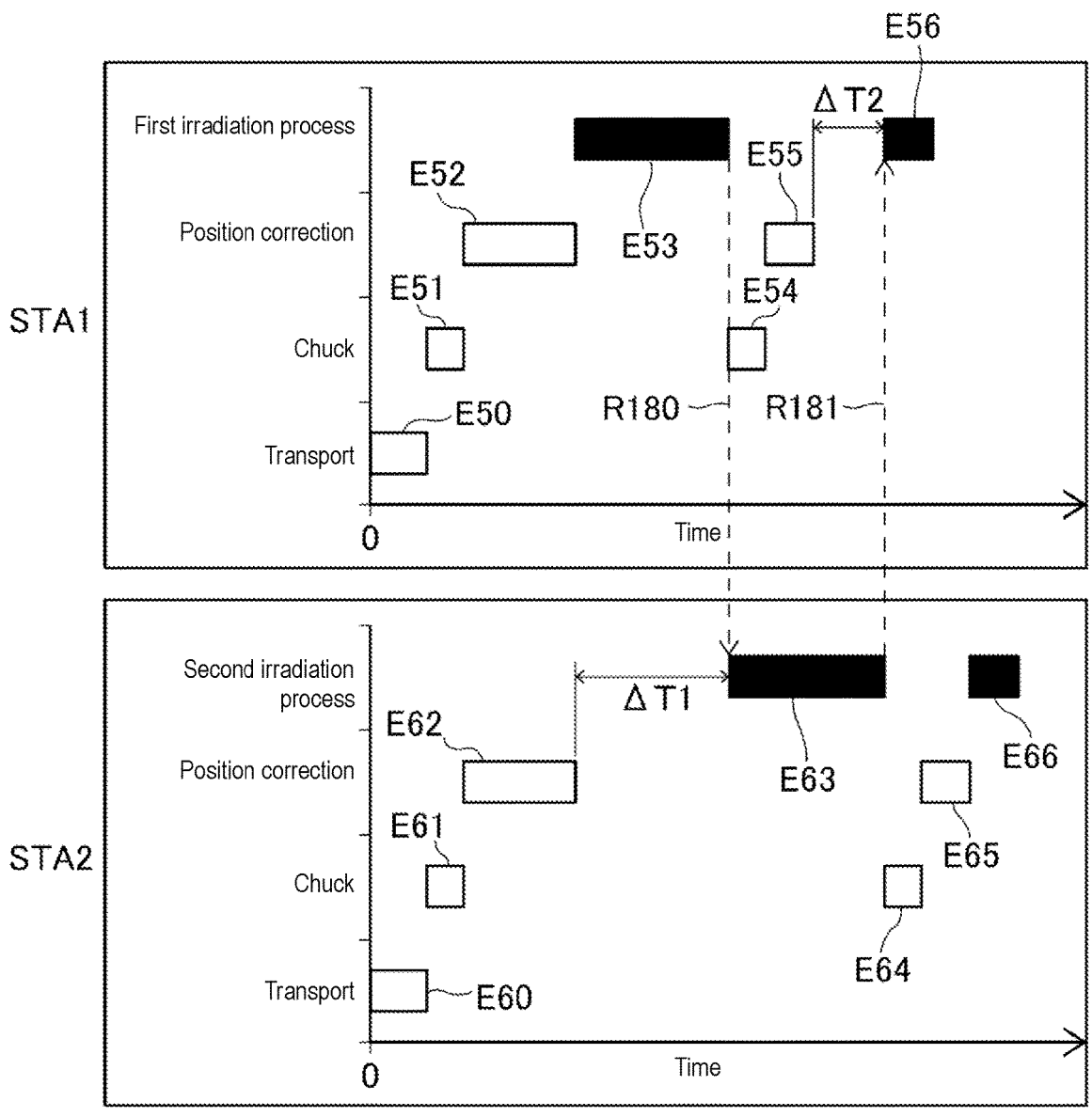
FIG. 20B is an explanatory diagram of a welding waiting time in a case of a first modification.

Specifically, FIG. 20A is an explanatory diagram of the welding waiting time in the case of the example shown in FIG. 19, and FIG. 20B is an explanatory diagram of the welding waiting time in the case of the first modification. FIGS. 20A and 20B show the execution times in time series by each range E22 to E42 and E50 to E66 having a bar shape for each process such as the irradiation process (the first irradiation process and the second irradiation process) and various preparation processes (the first preparation process and the second preparation process). Note that, in FIG. 20A, the execution periods substantially corresponding to the execution periods E22 to E42 shown in FIG. 19 are given the same reference numerals E22 to E42. In this case, the execution period E23 (the same applies to the execution period E34) is indicated by two separate execution times E23-1 and E23-2.

As seen by comparing FIGS. 20A and 20B, in the case of the example shown in FIG. 19, a welding waiting time AT1 can be shortened as compared with the case of the first modification.

Specifically, in the case of the first modification, the position correction is collectively executed for the welding target locations 90 of the 36 locations in the three scan areas 1400A to 1400C. Therefore, as shown in FIG. 20B, the execution period E52 of the position correction becomes longer than that in the case of the example shown in FIG. 19 (see the execution period E23-2 and the like in FIG. 20A). Therefore, in the case of the first modification, the waiting time until the second irradiation process of the first time (the second irradiation process for the welding target locations

90 of the 36 locations) can be started, i.e., the welding waiting time AT1 becomes relatively long.

On the other hand, according to the example shown in FIG. 19, position correction is dispersedly executed at every 12 locations for the welding target locations 90 of the 36 locations in the three scan areas 1400A to 1400C (see E23, E25, and E27 in FIGS. 19 and 20A). Therefore, in the example shown in FIG. 19, the waiting time until the second irradiation process of the first time (the second irradiation process for the welding target locations 90 of the 12 locations) can be started, i.e., the welding waiting time AT1 can be significantly shortened as compared with the case of the first modification. As a result, it is possible to shorten the time of the first welding process and the second welding process as a whole.

In the case of the first modification, since the execution period E63 of one second irradiation process is relatively long, a welding waiting time AT2 regarding the first irradiation process of the second time (the second irradiation process for the welding target locations 90 of the 12 locations) easily becomes long. On the other hand, according to the example shown in FIG. 19, since the execution period E63 of one second irradiation process is relatively short, the welding waiting time regarding the first irradiation processes for the second and subsequent times can be significantly shortened as compared with the case of the first modification (in FIG. 19, the welding waiting time regarding the first irradiation processes for the second and subsequent times is 0).

While each example has been described in detail above, the present disclosure is not limited to a specific example, and various modifications and changes can be made within the scope described in the claims. All or a plurality of the components of the above-described examples can be combined.

For example, in the example described above, in the case of using the 6-turn holding type jig, welding of the general part is achieved by the stations ST1, ST2, and ST3 in cooperation, but the present disclosure is not limited thereto. For example, in the case of using the 6-turn holding type jig, welding of the general part of the stator coil 24 may be achieved in cooperation by four stations including an additional station in addition to the stations ST1, ST2, and ST3. In this case, in each of the four stations including the stations ST1, ST2, and ST3, and the additional station, the number of times of chucking only needs to be 1, and further efficiency can be improved.

In the above-described examples, the laser oscillator 71 and the laser head 72 (or the laser oscillator 71A) are shared between two stations, but the laser oscillator 71 and the laser head 72 (or the laser oscillator 71A) may be shared among three or more stations.

REFERENCE SIGNS LIST

1: Motor (rotary electric machine), 24: Stator coil, 52: Coil piece, 40: Tip end part, 401: Abutment surface, 110: Laser beam, and 90: Welding target location

The invention claimed is:

1. A method for manufacturing a plurality of stators for a plurality of rotary electric machines in which a stator coil for each stator is formed of a plurality of coil pieces in a form of segment coil, the method comprising:

a first disposing process of disposing a first workpiece for a first stator in a first station;

a first welding process of completing welding of a first part of a first stator coil in the first workpiece in the first station;

a second disposing process of disposing a second workpiece for a second stator in a second station; and a second welding process of completing welding of a second part of a second stator coil in the second workpiece in the second station, wherein the first welding process includes a first irradiation process of irradiating a first coil piece of a first welding target related to the first part with a first laser beam for welding, the second welding process includes a second irradiation process of irradiating a second coil piece of a second welding target related to the second part with a second laser beam for welding, and the first irradiation process and the second irradiation process have a time difference, and the first laser beam and the second laser beam used in each of the first irradiation process and the second irradiation process is generated based on a common oscillator.

2. The method according to claim 1, wherein the first welding process further includes a first preparation process for executing the first irradiation process, the second welding process further includes a second preparation process for executing the second irradiation process, the first irradiation process is executed simultaneously with the second preparation process, and the second irradiation process is executed simultaneously with the first preparation process.

3. The method according to claim 2, wherein the first preparation process includes a first position determination process of determining a first irradiation position of the first laser beam in the first irradiation process based on a first image obtained by imaging the first coil piece of the first welding target related to the first part, the first preparation process includes a second position determination process of determining a second irradiation position of the second laser beam in the second irradiation process based on a second image obtained by imaging the second coil piece of the second welding target related to the second part, the first irradiation process is executed simultaneously with the second position determination process, and the second irradiation process is executed simultaneously with the first position determination process.

4. The method according to claim 2, wherein the first disposing process and the second disposing process include, when the second workpiece for which welding of the second part is completed in the second welding process is carried out from the second station, carrying in, to the second station, the first workpiece for which welding of the first part is completed in the first welding process, and carrying in a third workpiece to the first station.

5. The method according to claim 2, wherein in the first irradiation process, the first laser beam is emitted from a first laser head, in the second irradiation process, the second laser beam is emitted from the first laser head, and a process of moving the first laser head between the first station and the second station is further included.

6. The method according to claim 2, wherein in the first irradiation process, the first laser beam is emitted from a first laser head, in the second irradiation process, the second laser beam is emitted from a second laser head, and a process of switching between a first state in which the common oscillator and the first laser head are connected and a second state in which the common oscillator and the second laser head are connected is further included.

7. The method according to claim 2, wherein the laser beam has a wavelength of 0.6 μm or less, the first irradiation process includes a process of emitting the first laser beam from a first laser head positioned at a first position covering a first area of the first workpiece, and a process of emitting the second laser beam from a second laser head positioned at a second position covering a second area of the first workpiece, and the second irradiation process includes a process of emitting the second laser beam from a third laser head positioned at a third position covering a third area of the second workpiece, and a process of emitting the second laser beam from a fourth laser head positioned at a fourth position covering a fourth area of the first workpiece.

8. The method according to claim 2, wherein the first preparation process includes a first holding process of abutting first tip end parts of first coil pieces of the first welding target related to the first part on each other to hold the first tip end parts by a first jig, the first preparation process includes a second holding process of abutting second tip end parts of second coil pieces of the second welding target related to the second part on each other to hold the second tip end parts by a second jig, the first irradiation process is executed simultaneously with the second holding process, and the second irradiation process is executed simultaneously with the first holding process.

9. The method according to claim 8, wherein the first disposing process and the second disposing process include, when the second workpiece for which welding of the second part is completed in the second welding process is carried out from the second station, carrying in, to the second station, the first workpiece for which welding of the first part is completed in the first welding process, and carrying in a third workpiece to the first station.

10. The method according to claim 8, wherein in the first irradiation process, the first laser beam is emitted from a first laser head, in the second irradiation process, the second laser beam is emitted from the first laser head, and a process of moving the first laser head between the first station and the second station is further included.

11. The method according to claim 8, wherein in the first irradiation process, the first laser beam is emitted from a first laser head, in the second irradiation process, the second laser beam is emitted from a second laser head, and a process of switching between a first state in which the common oscillator and the first laser head are connected and a second state in which the common oscillator and the second laser head are connected is further included.

12. The method according to claim 8, wherein the laser beam has a wavelength of 0.6 μm or less, the first irradiation process includes a process of emitting the first laser beam from a first laser head positioned at a first position covering a first area of the first workpiece, and a process of emitting the second laser beam from a second laser head positioned at a second position covering a second area of the first workpiece, and the second irradiation process includes a process of emitting the second laser beam from a third laser head positioned at a third position covering a third area of the second workpiece, and a process of emitting the second laser beam from a fourth laser head positioned at a fourth position covering a fourth area of the first workpiece.

13. The method according to claim 8, wherein the first preparation process includes a first position determination process of determining a first irradiation position of the first laser beam in the first irradiation process based on a first image obtained by imaging the first coil piece of the first welding target related to the first part, the first preparation process includes a second position determination process of determining a second irradiation position of the second laser beam in the second irradiation process based on a second image obtained by imaging the second coil piece of the second welding target related to the second part, the first irradiation process is executed simultaneously with the second position determination process, and the second irradiation process is executed simultaneously with the first position determination process.

14. The method according to claim 1, wherein the first disposing process and the second disposing process include, when the second workpiece for which welding of the second part is completed in the second welding process is carried out from the second station, carrying in, to the second station, the first workpiece for which welding of the first part is completed in the first welding process, and carrying in a third workpiece to the first station.

15. The method according to claim 1, wherein in the first irradiation process, the first laser beam is emitted from a first laser head, in the second irradiation process, the second laser beam is emitted from the first laser head, and a process of moving the first laser head between the first station and the second station is further included.

16. The method according to claim 1, wherein in the first irradiation process, the first laser beam is emitted from a first laser head, in the second irradiation process, the second laser beam is emitted from a second laser head, and a process of switching between a first state in which the common oscillator and the first laser head are connected and a second state in which the common oscillator and the second laser head are connected is further included.

17. The method according to claim 1, wherein the laser beam has a wavelength of 0.6 $\mu$m or less, the first irradiation process includes a process of emitting the first laser beam from a first laser head positioned at a first position covering a first area of the first workpiece, and a process of emitting the second laser beam from a second laser head positioned at a second position covering a second area of the first workpiece, and the second irradiation process includes a process of emitting the second laser beam from a third laser head positioned at a third position covering a third area of the second workpiece, and a process of emitting the second laser beam from a fourth laser head positioned at a fourth position covering a fourth area of the first workpiece.

\* \* \* \* \*